(12) United States Patent
Adelman et al.

(10) Patent No.: US 12,379,927 B2
(45) Date of Patent: Aug. 5, 2025

(54) BFLOAT16 SCALE AND/OR REDUCE INSTRUCTIONS

(71) Applicant: Intel Corporation, Santa Clara, CA (US)

(72) Inventors: Menachem Adelman, Haifa (IL); Alexander Heinecke, San Jose, CA (US); Robert Valentine, Kiryat Tivon (IL); Zeev Sperber, Zikhron Yaakov (IL); Amit Gradstein, Binyamina (IL); Mark Charney, Lexington, MA (US); Evangelos Georganas, San Mateo, CA (US); Dhiraj Kalamkar, Bangalore (IN); Christopher Hughes, Santa Clara, CA (US); Cristina Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 17/463,382

(22) Filed: Aug. 31, 2021

(65) Prior Publication Data
US 2023/0068781 A1  Mar. 2, 2023

(51) Int. Cl.
*G06F 9/30*   (2018.01)

(52) U.S. Cl.
CPC ...... *G06F 9/30145* (2013.01); *G06F 9/30036* (2013.01); *G06F 9/30038* (2023.08); *G06F 9/30101* (2013.01); *G06F 9/30014* (2013.01)

(58) Field of Classification Search
CPC .......... G06F 9/30145; G06F 9/30036; G06F 9/30038; G06F 9/30101; G06F 9/30014
See application file for complete search history.

(56) References Cited

U.S. PATENT DOCUMENTS

| 4,815,021 | A   | 3/1989 | Steiner et al. |
| 9,448,765 | B2* | 9/2016 | Anderson ........... G06F 9/30038 |

(Continued)

FOREIGN PATENT DOCUMENTS

| CN | 112199119 A | 1/2021 |
| GB | 2186105 A   | 8/1987 |

(Continued)

OTHER PUBLICATIONS

European Search Report and Search Opinion, EP App. No. 22185939.0, Jan. 20, 2023, 9 pages.
European Search Report and Search Opinion, EP App. No. 22185990.3, Jan. 20, 2023, 10 pages.
Extended European Search Report and Search Opinion for Application No. 22183762.8, Dec. 21, 2022, 9 pages.

(Continued)

*Primary Examiner* — Corey S Faherty
(74) *Attorney, Agent, or Firm* — Nicholson De Vos Webster & Elliott LLP

(57) ABSTRACT

Techniques for scale and reduction of BF16 data elements are described. An exemplary instruction includes fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of the exponent of the power of 2 value is a floor value of a BF16 data element of the second packed data source, and store a result of the floating point scale operation into a corresponding data element position of the packed data destination operand.

35 Claims, 23 Drawing Sheets

(56) References Cited

U.S. PATENT DOCUMENTS

| | | | |
|---|---|---|---|
| 9,606,770 B2* | 3/2017 | Anderson | G06F 7/483 |
| 11,366,663 B2* | 6/2022 | Heinecke | G06F 9/30189 |
| 11,372,643 B2* | 6/2022 | Heinecke | G06F 9/30038 |
| 2003/0018676 A1 | 1/2003 | Shaw | |
| 2011/0047358 A1 | 2/2011 | Eichenberger et al. | |
| 2014/0067894 A1 | 3/2014 | Plondke et al. | |
| 2015/0088946 A1* | 3/2015 | Anderson | G06F 9/30038 708/208 |
| 2016/0224512 A1 | 8/2016 | Moudgill et al. | |
| 2019/0079768 A1 | 3/2019 | Heinecke et al. | |
| 2019/0220278 A1* | 7/2019 | Adelman | G06F 9/30038 |
| 2019/0384575 A1 | 12/2019 | Hickmann et al. | |
| 2020/0184309 A1 | 6/2020 | Patel | |
| 2020/0371794 A1 | 11/2020 | Zbiciak et al. | |
| 2020/0371805 A1 | 11/2020 | Lutz | |
| 2021/0117194 A1 | 4/2021 | Heinecke et al. | |
| 2021/0157589 A1 | 5/2021 | Heinecke et al. | |
| 2022/0121727 A1 | 4/2022 | Hong et al. | |
| 2022/0413805 A1* | 12/2022 | Li | G06F 9/30025 |
| 2023/0068781 A1* | 3/2023 | Adelman | G06F 9/30038 |
| 2024/0045682 A1* | 2/2024 | Heinecke | G06F 9/30145 |

FOREIGN PATENT DOCUMENTS

| | | | |
|---|---|---|---|
| WO | 2008/036946 A1 | 3/2008 | |
| WO | 2020/190814 A1 | 9/2020 | |

OTHER PUBLICATIONS

Intel, "Intel (registered) 64 and IA-32 Architectures Software Developer's Manual", vol. 2 (2A, 2B & 2C): Instruction Set Reference, A-Z, Order No. 325383-055US, Jun. 2015, 1011 pages.
Intel, "Intel® Architecture Instruction Set Extensions Programming Reference", Order No. 319433-023, Aug. 1, 2015, 1178 pages.
Office Action , EP App. No. 22185939.0 , Aug. 22, 2023, 05 pages.
Office Action , EP App. No. 22185990.3, Aug. 22, 2023, 05 pages.
Wikipedia, "bfloat16 floating-point format", available online at <https://en.wikipedia.org/w/index.php?title=Bfloat16_floating-point_format&oldid=1033549871>, Jul. 14, 2021, 4 pages.
European Search Report and Search Opinion, EP App. No. 22188067.7, Jan. 25, 2023, 12 pages.
European Search Report and Search Opinion, EP App. No. 22188069.3, Jan. 25, 2023, 10 pages.
European Search Report and Search Opinion, EP App. No. 22188079.2, Jan. 25, 2023, 10 pages.
Notification of Publication of Patent Application for Invention, CN App. No. 202210866252.7, Mar. 8, 2023, 3 pages (1 page of English Translation and 2 pages of Original Document).
Decision to grant, EP App. No. 22183762.8, Feb. 15, 2024, 2 pages.
Intention to grant, EP App. No. 22183762.8, Oct. 11, 2023, 7 pages.
Intel, "Intel® Architecture Instruction Set Extensions and Future Features Programming Reference", Reference No. 319433-032, Jan. 2018, 137 pages.
Notification of Oral Proceeding, EP App. No. 22185990.3, Mar. 22, 2024, 9 pages.

* cited by examiner

FETCH AN INSTRUCTION HAVING FIELDS FOR AN OPCODE, AN IDENTIFICATION OF A LOCATION OF A FIRST PACKED DATA SOURCE OPERAND, AN IDENTIFICATION OF A LOCATION OF A SECOND PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERANDS, A FLOATING POINT SCALE OPERATION OF A DATA ELEMENT OF THE FIRST PACKED DATA SOURCE BY MULTIPLYING THE DATA ELEMENT BY A POWER OF 2 VALUE WHEREIN A VALUE OF THE EXPONENT OF THE POWER OF 2 VALUE IS A FLOOR VALUE OF A DATA ELEMENT OF THE SECOND PACKED DATA SOURCE, AND STORE A RESULT OF THE FLOATING POINT SCALE OPERATION INTO A CORRESPONDING DATA ELEMENT POSITION OF THE PACKED DATA DESTINATION OPERAND 301

TRANSLATE THE FETCHED INSTRUCTION INTO ONE OR MORE INSTRUCTIONS 303

DECODE THE INSTRUCTION (OR THE TRANSLATED ONE OR MORE INSTRUCTIONS) 305

RETRIEVE DATA ASSOCIATED WITH THE SOURCE OPERAND(S) AND SCHEDULE 307

EXECUTE THE DECODED INSTRUCTION(S) TO PERFORM A FLOATING POINT SCALE OPERATION OF A DATA ELEMENT OF THE FIRST PACKED DATA SOURCE BY MULTIPLYING THE DATA ELEMENT BY A POWER OF 2 VALUE WHEREIN A VALUE OF THE EXPONENT OF THE POWER OF 2 VALUE IS A FLOOR VALUE OF A DATA ELEMENT OF THE SECOND PACKED DATA SOURCE, AND STORE A RESULT OF THE FLOATING POINT SCALE OPERATION INTO A CORRESPONDING DATA ELEMENT POSITION OF THE PACKED DATA DESTINATION OPERAND 309

COMMIT A RESULT OF THE EXECUTED INSTRUCTION(S) 311

FIG. 3

```
def scale_bf16_ne(src1,src2):
    tmp1 := src1
    tmp2 := src2
    IF (src1 is denormal):
        tmp1 := 0
    IF (src2 is denormal):
        tmp2 := 0
    return tmp1 * POW(2, FLOOR(tmp2)) //FTZ, RNE, SAE
```

```
VSCALEFNEPBF16 dest{k1}, src1, src2
(KL, VL) = (8, 128), (16, 256), (32, 512)

FOR j := 0 TO KL-1:
    IF k1[j] OR *no writemask*:
        IF SRC2 is memory and (EVEX.b == 1):
            tsrc2 := SRC2.bf16[0]
        ELSE:
            tsrc2 := SRC2.bf16[j]
        DEST.bf16[j] := scale_bf16_ne(SRC1.bf16[j], tsrc2)
    ELSE IF *zeroing*:
        DEST.bf16[j] := 0
    // else dest.bf16[j] remains unchanged

DEST[MAX_VL-1:VL] := 0
```

FIG. 4

FETCH AN INSTRUCTION HAVING FIELDS FOR AN OPCODE, AN IDENTIFICATION OF A LOCATION OF A PACKED DATA SOURCE OPERAND, AN IMMEDIATE, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERAND, AN EXTRACTION OF A REDUCED ARGUMENT OF A DATA ELEMENT OF THE PACKED DATA SOURCE BY A NUMBER OF BITS SPECIFIED IN THE IMMEDIATE, AND STORE THE EXTRACTED REDUCED ARGUMENT INTO A CORRESPONDING DATA ELEMENT POSITION OF THE PACKED DATA DESTINATION OPERAND 601

TRANSLATE THE FETCHED INSTRUCTION INTO ONE OR MORE INSTRUCTIONS 603

DECODE THE INSTRUCTION (OR THE TRANSLATED ONE OR MORE INSTRUCTIONS) 605

RETRIEVE DATA ASSOCIATED WITH THE SOURCE OPERAND(S) AND SCHEDULE 607

EXECUTE THE DECODED INSTRUCTION(S) TO PERFORM, FOR EACH DATA ELEMENT POSITION OF THE PACKED DATA SOURCE OPERAND, AN EXTRACTION OF A REDUCED ARGUMENT OF A DATA ELEMENT OF THE PACKED DATA SOURCE BY A NUMBER OF BITS SPECIFIED IN THE IMMEDIATE, AND STORE THE EXTRACTED REDUCED ARGUMENT INTO A CORRESPONDING DATA ELEMENT POSITION OF THE PACKED DATA DESTINATION OPERAND 609

COMMIT A RESULT OF THE EXECUTED INSTRUCTION(S) 611

FIG. 6

```
def reduce_bf16_ne(src,imm8):
    IF (*src is nan*):
        return QNAN(src)
    m := imm8[7:4]
    tmp := 2^(-m) * ROUND(2^m * src, RNE) //DAZ, SAE
    tmp := src - tmp //FTZ, RNE, SAE
    return tmp
```

```
VREDUCENEPBF16 dest{k1}, src, imm8
(KL, VL) = (8, 128), (16, 256), (32, 512)

FOR j := 0 TO KL-1:
    IF k1[j] OR *no writemask*:
        IF SRC is memory and (EVEX.b == 1):
            tsrc := SRC.bf16[0]
        ELSE:
            tsrc := SRC.bf16[j]
        DEST.bf16[j] := reduce_bf16_ne(tsrc, imm8)
    ELSE IF *zeroing*:
        DEST.bf16[j] := 0
    // else dest.bf16[j] remains unchanged

DEST[MAX_VL-1:VL] := 0
```

FIG. 7

```
┌─────────────────────────────────────────────────────────────────────┐
│ FETCH AN INSTRUCTION HAVING FIELDS FOR AN OPCODE, AN IDENTIFICATION │
│ OF A LOCATION OF A PACKED DATA SOURCE OPERAND, AN INDICATION OF A   │
│ ROUNDING MODE, AND AN IDENTIFICATION OF A PACKED DATA DESTINATION   │
│ OPERAND, WHEREIN THE OPCODE IS TO INDICATE THAT EXECUTION CIRCUITRY │
│ IS TO, FOR EACH PACKED DATA ELEMENT POSITION OF THE PACKED DATA     │
│ SOURCE OPERAND, ROUND THE PACKED DATA ELEMENT OF THAT POSITION BY   │
│ THE INDICATED ROUNDING MODE AND STORE A RESULT OF THE ROUND IN A    │
│ CORRESPONDING PACKED DATA ELEMENT POSITION OF THE PACKED DATA       │
│ DESTINATION OPERAND                                                 │
│                                 901                                 │
└─────────────────────────────────────────────────────────────────────┘
                                    │
                                    ▼
┌─────────────────────────────────────────────────────────────────────┐
│ TRANSLATE THE FETCHED INSTRUCTION INTO ONE OR MORE INSTRUCTIONS 903 │
└─────────────────────────────────────────────────────────────────────┘
                                    │
                                    ▼
┌─────────────────────────────────────────────────────────────────────┐
│   DECODE THE INSTRUCTION (OR THE TRANSLATED ONE OR MORE             │
│   INSTRUCTIONS)                                                     │
│                              905                                    │
└─────────────────────────────────────────────────────────────────────┘
                                    │
                                    ▼
┌─────────────────────────────────────────────────────────────────────┐
│  RETRIEVE DATA ASSOCIATED WITH THE SOURCE OPERAND(S) AND SCHEDULE 907│
└─────────────────────────────────────────────────────────────────────┘
                                    │
                                    ▼
┌─────────────────────────────────────────────────────────────────────┐
│ EXECUTE THE DECODED INSTRUCTION(S) TO, FOR EACH PACKED DATA ELEMENT │
│ POSITION OF THE PACKED DATA SOURCE OPERAND, ROUND THE PACKED DATA   │
│ ELEMENT OF THAT POSITION BY THE INDICATED ROUNDING MODE AND STORE A │
│ RESULT OF THE ROUND IN A CORRESPONDING PACKED DATA ELEMENT POSITION │
│ OF THE PACKED DATA DESTINATION OPERAND  909                         │
└─────────────────────────────────────────────────────────────────────┘
                                    │
                                    ▼
┌─────────────────────────────────────────────────────────────────────┐
│         COMMIT A RESULT OF THE EXECUTED INSTRUCTION(S)              │
│                              911                                    │
└─────────────────────────────────────────────────────────────────────┘
```

FIG. 9

```
def round_bf16_to_integer_ne(src,imm8):
    IF (*src is nan*):
        return QNAN(src)
    m := imm8[7:4]
    tmp := ROUND_TO_NEAREST_EVEN_INTEGER(2^m * src) //DAZ, SAE
    tmp := 2^(-m) * tmp //FTZ, RNE, SAE
    return tmp
```

```
VRNDSCALEBF16 dest{k1}, src, imm8
(KL, VL) = (8, 128), (16, 256), (32, 512)

FOR j := 0 TO KL-1:
    IF k1[j] OR *no writemask*:
        IF SRC is memory and (EVEX.b == 1):
            tsrc := SRC.bf16[0]
        ELSE:
            tsrc := SRC.bf16[j]
        DEST.bf16[j] := round_bf16_to_integer_ne(tsrc, imm8)
    ELSE IF *zeroing*:
        DEST.bf16[j] := 0
    // else dest.bf16[j] remains unchanged

DEST[MAX_VL-1:VL] := 0
```

FIG. 10

BFLOAT16 SCALE AND/OR REDUCE INSTRUCTIONS

BACKGROUND

In recent years fused-multiply-accumulate (FMA) units with lower-precision multiplications and higher-precision accumulation have proven useful in machine learning/artificial intelligence applications, most notably in training deep neural networks due to their extreme computational intensity. Compared to classical IEEE-754 32-bit (FP32) and 64-bit (FP64) arithmetic, this reduced precision arithmetic can naturally be sped up disproportional to their shortened width.

BRIEF DESCRIPTION OF DRAWINGS

Various embodiments in accordance with the present disclosure will be described with reference to the drawings, in which:

FIG. 3 illustrates an embodiment of method performed by a processor to process a calculate a scale of BF16 data elements instruction.

FIG. 4 illustrates exemplary embodiments of pseudo code representing the execution and format of a calculate a scale of BF16 data elements instruction

FIG. 6 illustrates embodiments of an exemplary method performed by a processor to process an instruction to extract a reduced argument of BF16 data elements according to some embodiments.

FIG. 7 illustrates exemplary embodiments of pseudo code representing the execution and format of an extract a reduced argument of BF16 data elements instruction.

FIG. 9 illustrates embodiments of an exemplary method performed by a processor to process an instruction to round BF16 data elements according to some embodiments.

FIG. 10 illustrates exemplary embodiments of pseudo code representing the execution and format of a round BF16 data elements instruction.

DETAILED DESCRIPTION

The present disclosure relates to methods, apparatus, systems, and non-transitory computer-readable storage media for instructions for calculating a scale of BF16 data elements, a reduced argument of BF16 data elements, or rounding of BF16 data elements.

Figure 1:
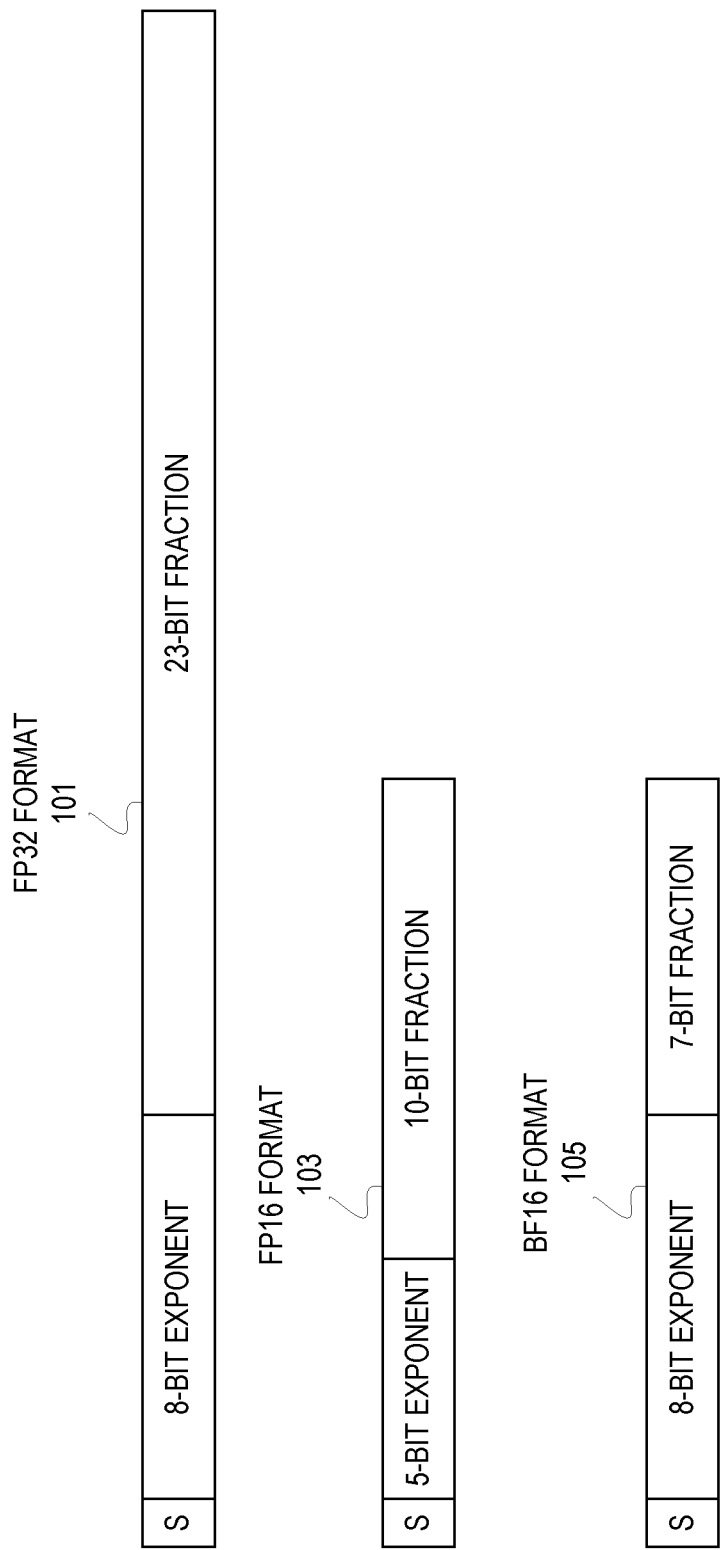
FIG. 1 illustrates different floating point representation formats.

BF16 is gaining traction due to its ability to work well in machine learning algorithms, in particular deep learning training. FIG. 1 illustrates different floating point representation formats. In this illustration, the formats are in little endian format, however, in some embodiments, a big endian format is used. The FP32 format 101 has a sign bit(S), an 8-bit exponent, and a 23-bit fraction (a 24-bit mantissa that uses an implicit bit). The FP16 format 103 has a sign bit(S), a 5-bit exponent, and a 10-bit fraction. The BF16 format 105 has a sign bit(S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

Detailed herein are embodiments of instructions, and their support, that operate on BF16 source data elements. In some embodiments, an execution of a single instruction causes a floating-point scale of the packed BF16 floating-point values in a first source operand by multiplying it by power of 2 of the BF16 values in a second source operand and storing of the floating-point scales in a destination operand. In some embodiments, an execution of a single instruction causes an extraction of a reduced argument of BF16 values in a first source operand by a number of bits specified in an operand or immediate and places the reduced arguments in a destination operand. In some embodiments, an execution of a single instruction causes a rounding of BF16 values in a source operand by a rounding mode specified in an operand or immediate and places the values in the destination operand.

In some embodiments, the single instruction is translated from a first instruction set architecture (ISA) to one or more instructions of a second ISA and the execution of the one or more instructions of the second ISA perform those calculations.

In some embodiments, one or more of the instructions are defined such as their execution is to treat denormal inputs or outputs as zeros, support any rounding mode, and/or report or suppress floating point numerical flags.

Figure 2:
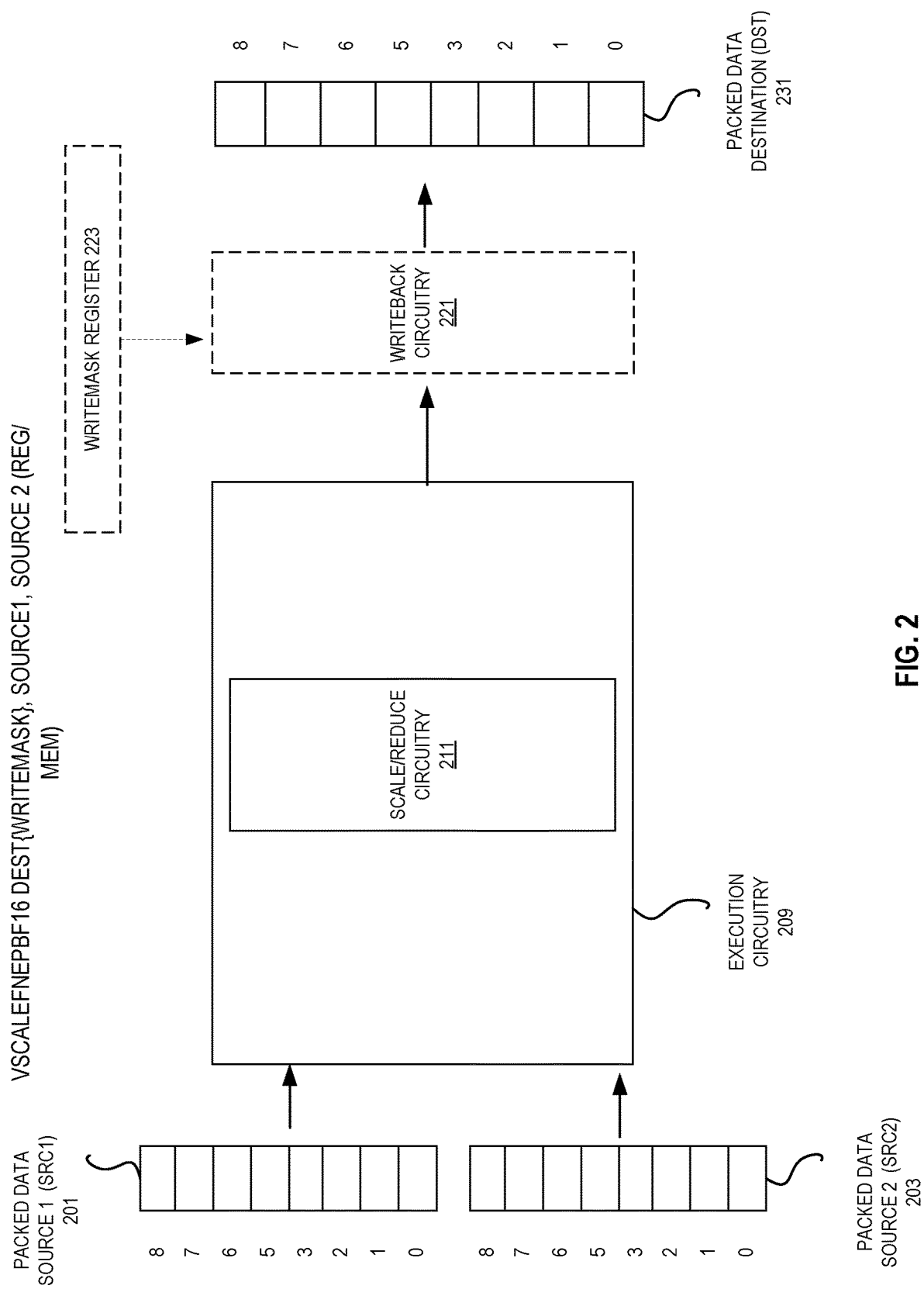
FIG. 2 illustrates an exemplary execution of an instruction to calculate a scale of BF16 data elements.

FIG. 2 illustrates an exemplary execution of an instruction to calculate a scale of BF16 data elements. While this illustration is in little endian format, the principles discussed herein work in big endian format. In particular, the execution of this instruction causes a calculation of floating-point scale of the packed BF16 floating-point values in the first source operand by multiplying it by power of 2 of the BF16 values in second source operand and storing the destination operand.

The calculate a scale of BF16 data elements instruction (shown here with an exemplary opcode mnemonic of VSCALEFNEPBF) includes one or more fields to define the opcode for the instruction, one or more fields to reference or indicate a first and a second packed data source (e.g., a register or memory location), and/or one or more fields to reference or indicate a packed data source (e.g., a register or memory location). In some embodiments, the instruction also includes one or more fields to reference or indicate a writemask or predication register that is to store writemask or predicate values as described later.

An embodiment of a format for a calculate a scale of BF16 data elements instruction is VSCALEFNEPBF DST{k}, SRC1, SRC2. In some embodiments, VSCALEFNEPBF is the opcode mnemonic of the instruction. DST is a field for the packed data destination register operand. SRC1 and SRC1 is one or more fields for the sources such as packed data register and/or memory. The source operands and destination operand may come in one or more sizes such as 128-bit, 256-bit, 512-bit, etc. The {k} is used when writemasking or predication is used.

In this example, the first packed data source 201 includes 8 packed data elements each of which is in BF16 format. The first packed data source 201 may be a register or a memory location. The second packed data source 203 includes 8 packed data elements each of which is in BF16 format. The second packed data source 203 may be a register or a memory location.

The packed data sources 201 and 203 are fed into execution circuitry 209 to be operated on to calculate the floating-point scale. In some embodiments, the execution circuitry 209 the scale is calculated according to the following destination=source $1*2^{(floor(source\ 1))}$ using scale/reduction circuitry 211. In some embodiments, this execution of the instruction uses a round to nearest (even) rounding mode. In some embodiments, output denormals are always flushed to zero and input denormals are always treated as zero.

The packed data destination 231 is written to store the resultant scale values in corresponding packed data elements as the packed data source 201. In some embodiments, when the instruction calls for the use of predication or writemasking, a writemask (or predicate) register 231 dictates how the resultant scale values are stored and/or zeroed using the writemask circuitry 221.

FIG. 3 illustrates an embodiment of method performed by a processor to process a calculate a scale of BF16 data elements instruction. For example, a processor core as shown in FIG. 14(B), a pipeline as detailed below, etc. performs this method.

At 301 an instruction is fetched having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value wherein a value of the exponent of the power of 2 value is a floor value of a data element of the second packed data source, and store a result of the floating point scale operation into a corresponding data element position of the packed data destination operand.

In some embodiments, the fetched instruction, of a first ISA, is translated into one or more instructions of a second, different ISA at 303. The one or more instructions of the second, different ISA, when executed, provided the same result as if the fetched instruction had been executed. Note the translation may be performed by hardware, software, or a combination thereof.

The instruction (or the translated one or more instructions) is/are decoded 305. This decoding may cause the generation of one or more micro-operations to be performed. Note that as this instruction Data values associated with the source operands of the decoded instruction are retrieved at 307. For example, when a source operand is stored in memory, the data from the indicated memory location is retrieved.

At 309, the decoded instruction(s) is/are executed by execution circuitry (hardware) such as that detailed herein. The execution circuitry is to perform for each data element position of the packed data source operands, a floating point scale operation of a data element of the first packed data source by multiplying the data element by a power of 2 value wherein a value of the exponent of the power of 2 value is a floor value of a data element of the second packed data source, and store a result of the floating point scale operation into a corresponding data element position of the packed data destination operand.

In some embodiments, the instruction is committed or retired at 311.

FIG. 4 illustrates exemplary embodiments of pseudo code representing the execution and format of a calculate a scale of BF16 data elements instruction. Note that EVEX.b maps to the b of prefix 1701(C). The comment of DAZ, FTZ, RNE, and SAE refer to the use of support for flush-to-zero (FTZ), denormals-are-zero (DAZ), suppress all exceptions (SAE), and round-to-even (RNE) rounding.

Figure 5:
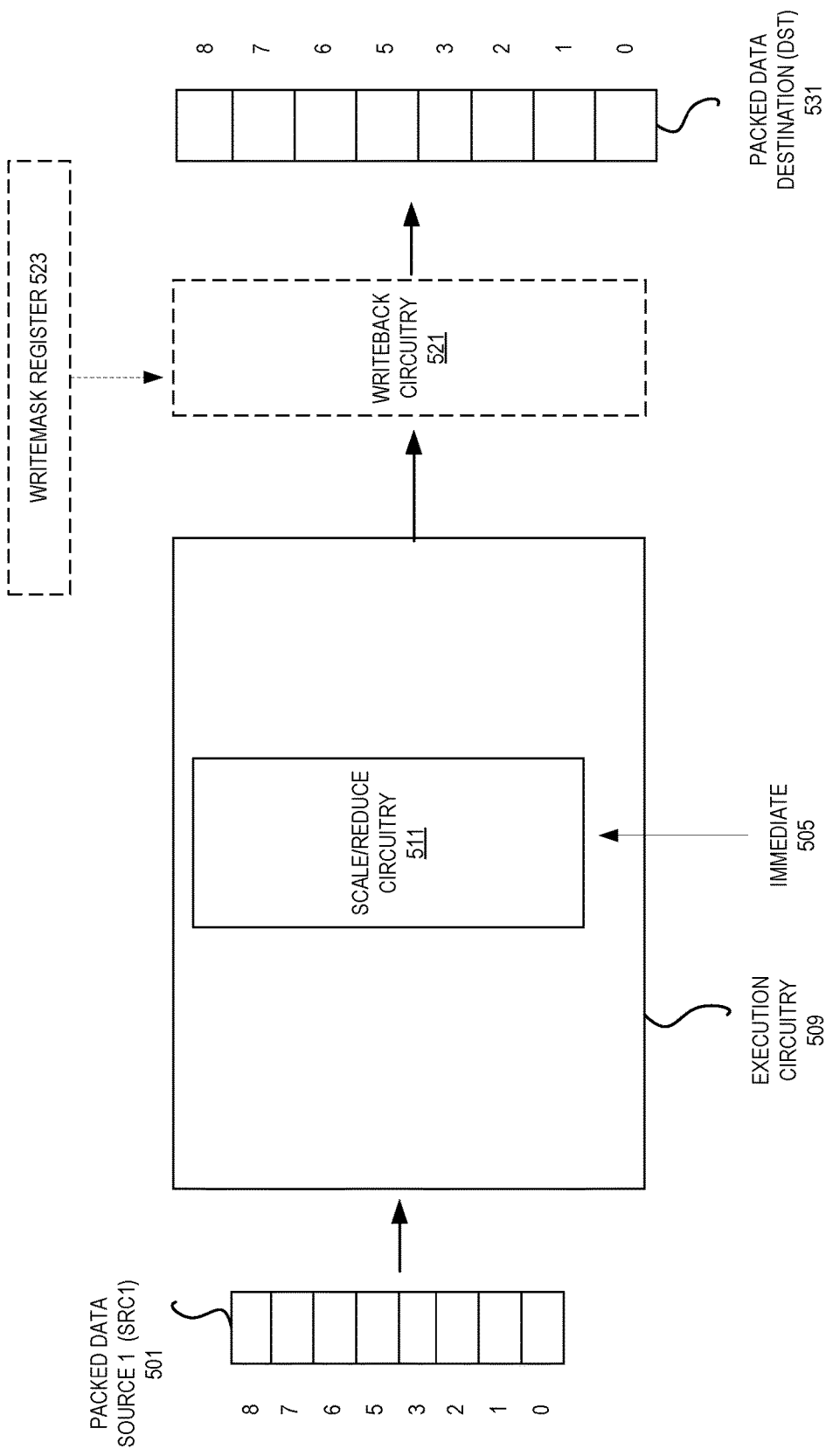
FIG. 5 illustrates embodiments of execution of an extract a reduced argument of BF16 data elements instruction according to some embodiments.

FIG. 5 illustrates embodiments of execution of an extract a reduced argument of BF16 data elements instruction according to some embodiments. While this illustration is in little endian format, the principles discussed herein work in big endian format. The extract a reduced argument of BF16 data elements instruction (shown here with an exemplary opcode mnemonic of VREDUCENEPBF16) includes one or more fields to define the opcode for the instruction, one or more fields to reference or indicate a BF16 packed data source (e.g., a register or memory location), one more fields to indicate a scaling value (e.g., portions of an immediate or a scaling value stored in a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

An embodiment of a format for an extract a reduced argument of BF16 data elements instruction is VREDUCE-NEPBF16 DST{k}, SRC1 IMM8. In some embodiments, VREDUCENEPBF16 is the opcode mnemonic of the instruction. DST is a field for the packed data destination register operand. SRC1 is one or more fields for the source such as packed data register and/or memory. IMM8 refers to an immediate. The source operand and destination operand may come in one or more sizes such as 128-bit, 256-bit, 512-bit, etc. The {k} is used when writemasking or predication is used.

In this example, the packed data source 501 includes 8 packed data elements each of which is in BF16 format. The packed data source 501 may be a register or a memory location.

The packed data source 501 and immediate ISAR05 are fed into execution circuitry 509 to be operated on. In particular, execution circuitry 509 (such as scale/reduce circuitry 511) performs an extraction of a reduced argument of BF16 data elements of the packed data source ISAR01 according to a scale provided by the immediate 505. In some embodiments, the execution circuitry 209 the scale is calculated according to the following destination=source 1*(ROUND($2^M$*source 1))*$2^{-M}$ using scale/reduction circuitry 511. The scaling value M comes from the immediate 505.

In some embodiments, this execution of the instruction uses a round to nearest (even) rounding mode. In some embodiments, output denormals are always flushed to zero and input denormals are always treated as zero.

The packed data destination 531 is written to store the resultant reduced values in corresponding packed data elements as the packed data source 501. In some embodiments, when the instruction calls for the use of predication or writemasking, a writemask (or predicate) register 531 dictates how the resultant BF16-formated reduced values are stored and/or zeroed using the writemask circuitry 521.

FIG. 6 illustrates embodiments of an exemplary method performed by a processor to process an instruction to extract a reduced argument of BF16 data elements according to some embodiments. For example, a processor core as shown in FIG. 14(B), a pipeline as detailed below, etc. performs this method.

At 601 an instruction is fetched having fields for an opcode, an identification of a location of a packed data source operand, and an identification of a packed data destination operand, wherein the opcode is to indicate that execution circuitry is to perform, for each data element position of the packed data source operand, an extraction of a reduced argument of a data element of the packed data source 501 by a number of bits specified in the immediate 505, and store the extracted reduced argument into a corresponding data element position of the packed data destination operand 531 using the scale/reduce circuitry 511.

In some embodiments, the fetched instruction, of a first ISA, is translated into one or more instructions of a second, different ISA at 603. The one or more instructions of the second, different ISA, when executed, provided the same result as if the fetched instruction had been executed. Note the translation may be performed by hardware, software, or a combination thereof.

The instruction (or the translated one or more instructions) is/are decoded 605. This decoding may cause the generation of one or more micro-operations to be performed. Note that as this instruction Data values associated with the source operand of the decoded instruction are retrieved at 607. For example, when a source operand is stored in memory, the data from the indicated memory location is retrieved.

At 609, the decoded instruction(s) is/are executed by execution circuitry (hardware) such as that detailed herein. The execution circuitry is to perform, for each data element position of the packed data source operand, an extraction of a reduced argument of a data element of the packed data source by a number of bits specified in the immediate, and store the extracted reduced argument into a corresponding data element position of the packed data destination operand.

In some embodiments, the instruction is committed or retired at 611.

FIG. 7 illustrates exemplary embodiments of pseudo code representing the execution and format of an extract a reduced argument of BF16 data elements instruction. Note that EVEX.b maps to the b of prefix 1701(C). The comment of DAZ, FTZ, RNE, and SAE refer to the use of support for flush-to-zero (FTZ), denormals-are-zero (DAZ), suppress all exceptions (SAE), and round-to-even (RNE) rounding.

Figure 8:
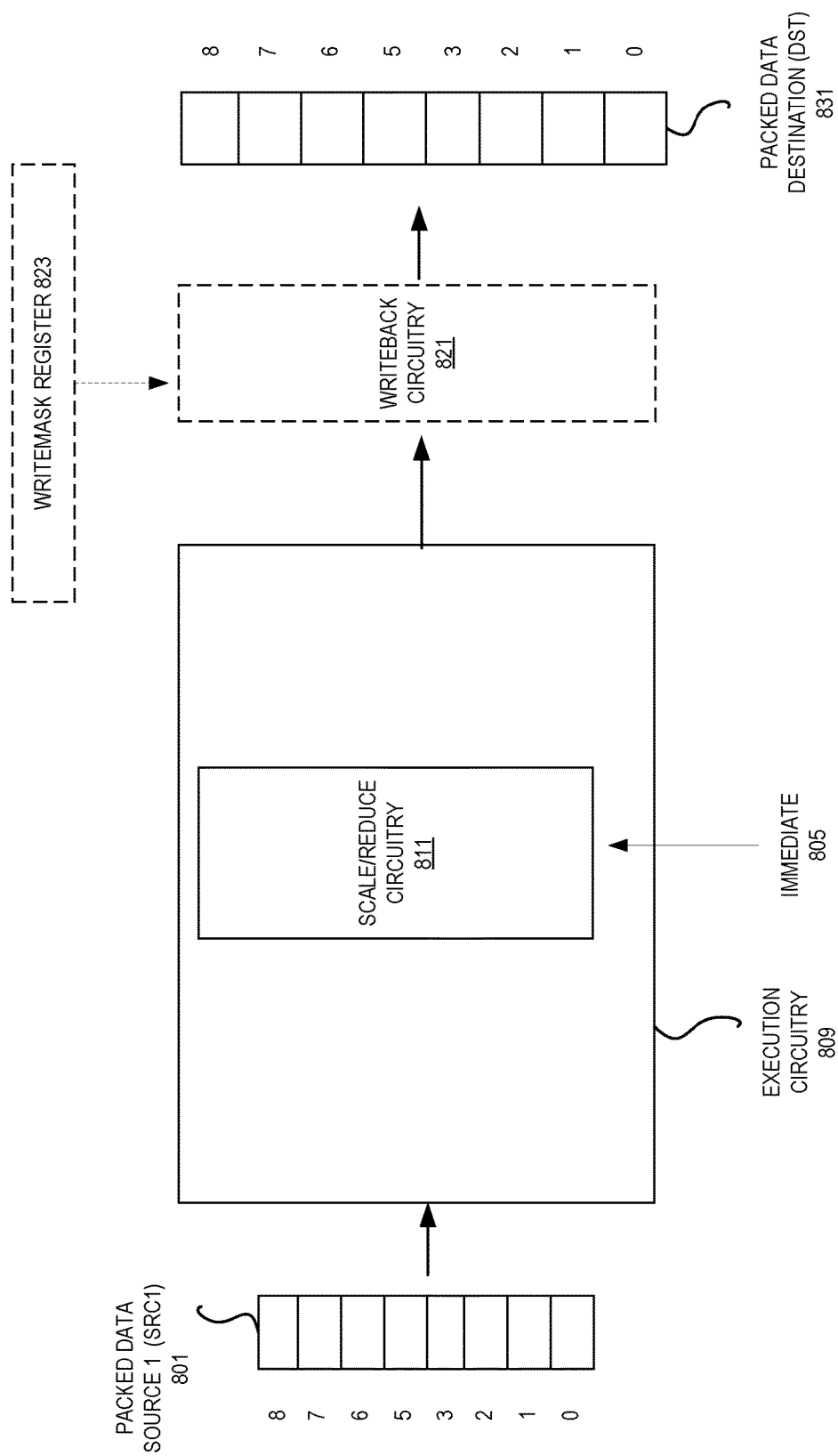
FIG. 8 illustrates embodiments of execution of a round BF16 data elements instruction according to some embodiments.

FIG. 8 illustrates embodiments of execution of a round BF16 data elements instruction according to some embodiments. While this illustration is in little endian format, the principles discussed herein work in big endian format. The round BF16 data elements instruction (shown here with an exemplary opcode mnemonic of VRNDSCALENEPBF16) includes one or more fields to define the opcode for the instruction, one or more fields to reference or indicate a BF16 packed data source (e.g., a register or memory location), one more fields to indicate a rounding mode (e.g., portions of an immediate or a scaling value stored in a register or memory location), and/or one or more fields to reference or indicate a packed data destination (e.g., a register or memory location). In some embodiments, the instruction also includes one or more fields to reference or indicate a writemask or predication register that is to store writemask or predicate values as described later.

An embodiment of a format for a round BF16 data elements instruction is VRNDSCALENEPBF16 DST{k}, SRC1 IMM. In some embodiments, VRNDSCALE-NEPBF16 is the opcode mnemonic of the instruction. DST is a field for the packed data destination register operand. SRC1 is one or more fields for the sources such as packed data register, memory location, and/or a vector broadcast from a memory location. IMM refers to an immediate encoding the rounding mode. The source operand and destination operand may come in one or more sizes such as 128-bit, 256-bit, 512-bit, etc. The {k} is used when writemasking or predication is used.

In this example, the packed data source 801 includes 8 packed data elements each of which is in BF16 format. The packed data source 801 may be a register or a memory location.

The packed data source 801 and immediate 805 are fed into execution circuitry 809 to be operated on. In particular, execution circuitry 809 (such as scale/reduce circuitry 811) performs a round of BF16 data elements in the source operand 801 by a rounding mode specified by the immediate 805. The rounding rounds the input to an integer value, plus a number of bits of fraction that are specified by the immediate (to be included in the result) to generate a per data element result and stores the results as BF16 values in the destination 831. The rounding is defined in some embodiments as destination=$2^{-M}$*Round to nearest even integer ($2^M$*SRC). M is set by the immediate such as bits 7:4 of an 8-bit immediate. In some embodiments, scale/reduce circuitry 811 of the execution circuitry 209 performs this operation.

In some embodiments, if any data element is a signaling non-a-number (SNaN) then it will be converted to a quiet not-a-number (QNaN). In some embodiments, this execution of the instruction uses a round to nearest (even) rounding mode. In some embodiments, output denormals are always flushed to zero and input denormals are always treated as zero. The sign of the result of this instruction is preserved, including the sign of zero.

The packed data destination 831 is written to store the resultant values in corresponding packed data elements as the packed data source 801. In some embodiments, when the instruction calls for the use of predication or writemasking, a writemask (or predicate) register 831 dictates how the resultant values are stored and/or zeroed using the writemask circuitry 821.

FIG. 9 illustrates embodiments of an exemplary method performed by a processor to process an instruction to round BF16 data elements according to some embodiments. For example, a processor core as shown in FIG. 14(B), a pipeline as detailed below, etc. performs this method.

At 901 an instruction is fetched having fields for an opcode, an identification of a location of a packed data source operand, an indication of a rounding mode, and an identification of a packed data destination operand, wherein the opcode is to indicate that execution circuitry is to, for each packed data element position of the packed data source operand, round the packed data element of that position by the indicated rounding mode and store a result of the round in a corresponding packed data element position of the packed data destination operand.

In some embodiments, the fetched instruction, of a first ISA, is translated into one or more instructions of a second, different ISA at 903. The one or more instructions of the second, different ISA, when executed, provided the same result as if the fetched instruction had been executed. Note the translation may be performed by hardware, software, or a combination thereof.

The instruction (or the translated one or more instructions) is/are decoded 905. This decoding may cause the generation of one or more micro-operations to be performed. Note that as this instruction Data values associated with the source operand of the decoded instruction are retrieved at 907. For example, when a source operand is stored in memory, the data from the indicated memory location is retrieved.

At 909, the decoded instruction(s) is/are executed by execution circuitry (hardware) such as that detailed herein. The execution circuitry is to, for each packed data element position of the packed data source operand, round the packed data element of that position by the indicated rounding mode and store a result of the round in a corresponding packed data element position of the packed data destination operand.

In some embodiments, the instruction is committed or retired at 911.

FIG. 10 illustrates exemplary embodiments of pseudo code representing the execution and format of a round BF16 data elements instruction. Note that EVEX.b maps to the b of prefix 1701(C). The comment of DAZ, FTZ, RNE, and SAE refer to the use of support for flush-to-zero (FTZ), denormals-are-zero (DAZ), suppress all exceptions (SAE), and round-to-even (RNE) rounding.

Figure 11:
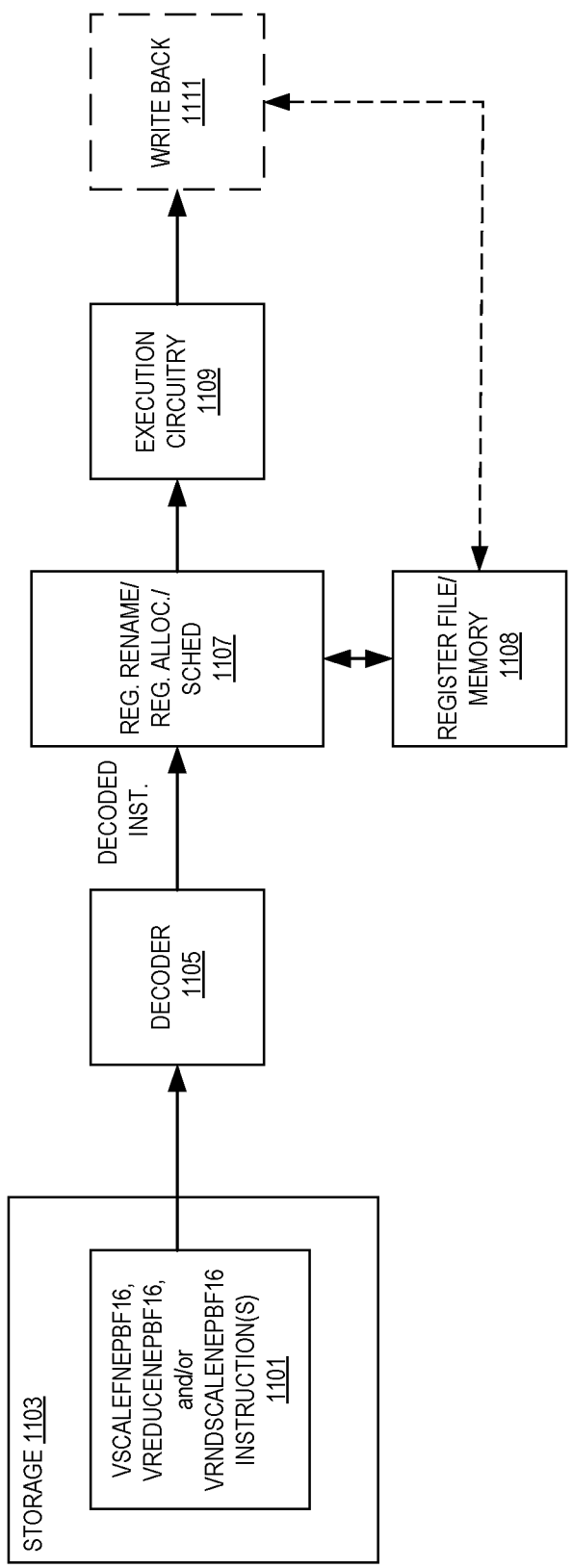
FIG. 11 illustrates embodiments of hardware to process an instruction such as the VSCALEFNEPBF16, VREDUCE-NEPBF16, and/or VRNDSCALENEPBF16 instructions.

FIG. 11 illustrates embodiments of hardware to process an instruction such as the VSCALEFNEPBF16, VREDUCENEPBF16, and/or VRNDSCALENEPBF16 instructions. As illustrated, storage 1103 stores a VSCALEFNEPBF16, VREDUCENEPBF16, and/or VRNDSCALENEPBF16 instruction 1101 to be executed.

The instruction 1101 is received by decode circuitry 1105. For example, the decode circuitry 1105 receives this instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation is to be performed.

More detailed embodiments of at least one instruction format will be detailed later. The decode circuitry 1105 decodes the instruction into one or more operations. In some embodiments, this decoding includes generating a plurality of micro-operations to be performed by execution circuitry (such as execution circuitry 1109). The decode circuitry 1105 also decodes instruction prefixes.

In some embodiments, register renaming, register allocation, and/or scheduling circuitry 1107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1108 store data as operands of the instruction to be operated on by execution circuitry 1109. Exemplary register types include packed data registers, general purpose registers, and floating-point registers.

Execution circuitry 1109 executes the decoded instruction. Exemplary detailed execution circuitry is shown in FIGS. 2, 14, etc. The execution of the decoded instruction causes the execution circuitry to perform the operations detailed above.

In some embodiments, retirement/write back circuitry 1111 architecturally commits the result 1108 and retires the instruction.

Exemplary Computer Architectures

Detailed below are describes of exemplary computer architectures, instruction formats, etc. that support the discussed instructions. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 12:
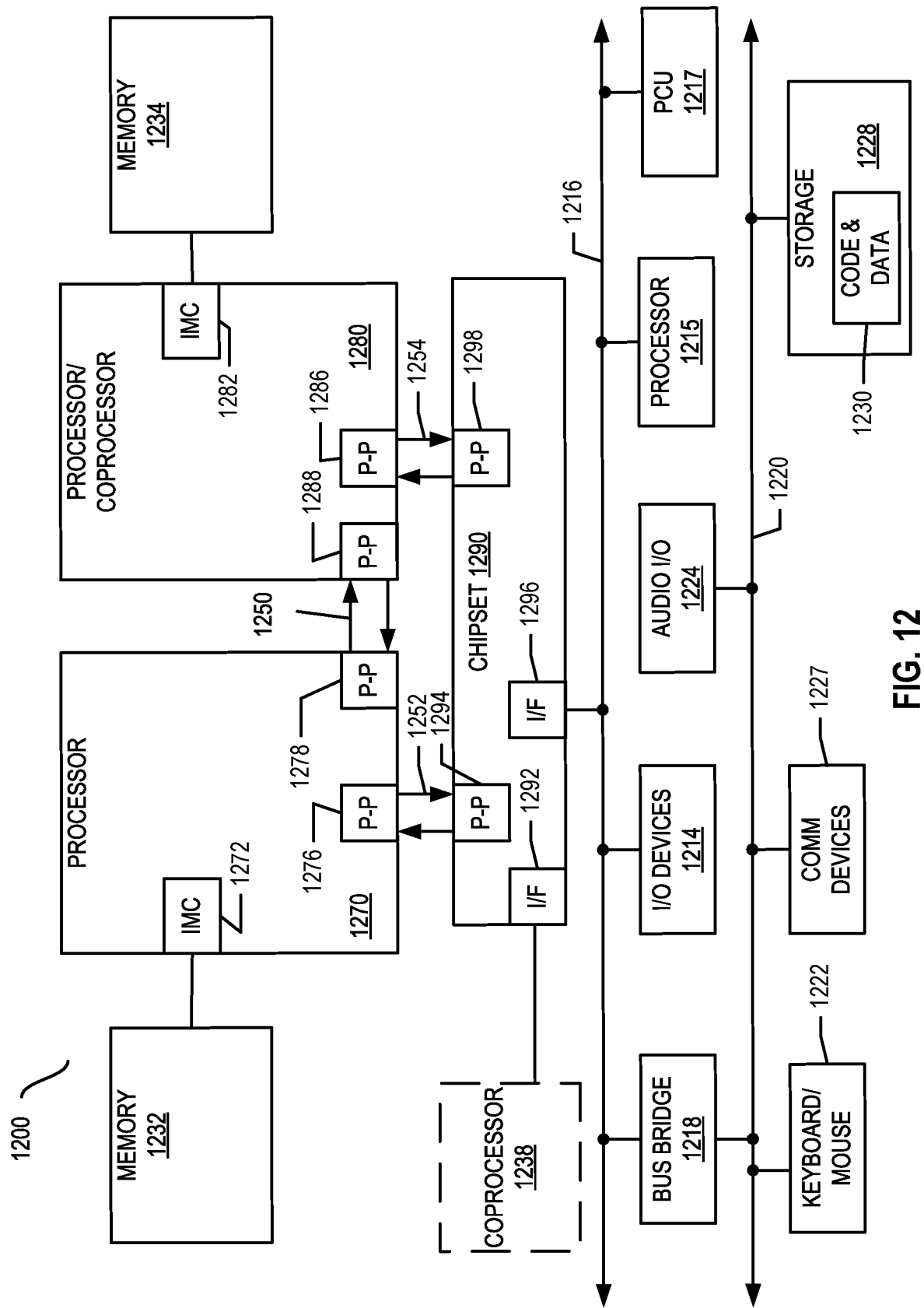
FIG. 12 illustrates embodiments of an exemplary system.

FIG. 12 illustrates embodiments of an exemplary system. Multiprocessor system 1200 is a point-to-point interconnect system and includes a plurality of processors including a first processor 1270 and a second processor 1280 coupled via a point-to-point interconnect 1250. In some embodiments, the first processor 1270 and the second processor 1280 are homogeneous. In some embodiments, first processor 1270 and the second processor 1280 are heterogenous.

Processors 1270 and 1280 are shown including integrated memory controller (IMC) units circuitry 1272 and 1282, respectively. Processor 1270 also includes as part of its interconnect controller units point-to-point (P-P) interfaces 1276 and 1278; similarly, second processor 1280 includes P-P interfaces 1286 and 1288. Processors 1270, 1280 may exchange information via the point-to-point (P-P) interconnect 1250 using P-P interface circuits 1278, 1288. IMCs 1272 and 1282 couple the processors 1270, 1280 to respective memories, namely a memory 1232 and a memory 1234, which may be portions of main memory locally attached to the respective processors.

Processors 1270, 1280 may each exchange information with a chipset 1290 via individual P-P interconnects 1252, 1254 using point to point interface circuits 1276, 1294, 1286, 1298. Chipset 1290 may optionally exchange information with a coprocessor 1238 via a high-performance interface 1292. In some embodiments, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor 1270, 1280 or outside of both processors, yet connected with the processors via P-P interconnect, such that either or both processors' local cache information may be stored in the shared cache if a processor is placed into a low power mode.

Chipset 1290 may be coupled to a first interconnect 1216 via an interface 1296. In some embodiments, first interconnect 1216 may be a Peripheral Component Interconnect (PCI) interconnect, or an interconnect such as a PCI Express interconnect or another I/O interconnect. In some embodiments, one of the interconnects couples to a power control unit (PCU) 1217, which may include circuitry, software, and/or firmware to perform power management operations with regard to the processors 1270, 1280 and/or co-processor 1238. PCU 1217 provides control information to a voltage regulator to cause the voltage regulator to generate the appropriate regulated voltage. PCU 1217 also provides control information to control the operating voltage generated. In various embodiments, PCU 1217 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1217 is illustrated as being present as logic separate from the processor 1270 and/or processor 1280. In other cases, PCU 1217 may execute on a given one or more of cores (not shown) of processor 1270 or 1280. In some cases, PCU 1217 may be implemented as a microcontroller (dedicated or general-purpose) or other control logic configured to execute its own dedicated power management code, sometimes referred to as P-code. In yet other embodiments, power management operations to be performed by PCU 1217 may be implemented externally to a processor, such as by way of a separate power management integrated circuit (PMIC) or another component external to the processor. In yet other embodiments, power management operations to be performed by PCU 1217 may be implemented within BIOS or other system software.

Various I/O devices 1214 may be coupled to first interconnect 1216, along with an interconnect (bus) bridge 1218 which couples first interconnect 1216 to a second interconnect 1220. In some embodiments, one or more additional processor(s) 1215, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 1216. In some embodiments, second interconnect 1220 may be a low pin count (LPC) interconnect. Various devices may be coupled to second interconnect 1220 including, for example, a keyboard and/or mouse 1222, communication devices 1227 and a storage unit circuitry 1228. Storage unit circuitry 1228 may be a disk drive or other mass storage device which may include instructions/code and data 1230, in some embodiments. Further, an audio I/O 1224 may be coupled to second interconnect 1220. Note that other architectures than the point-to-point architecture described above are possible. For example, instead of the point-to-point architecture, a system such as multiprocessor system 1200 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 13:
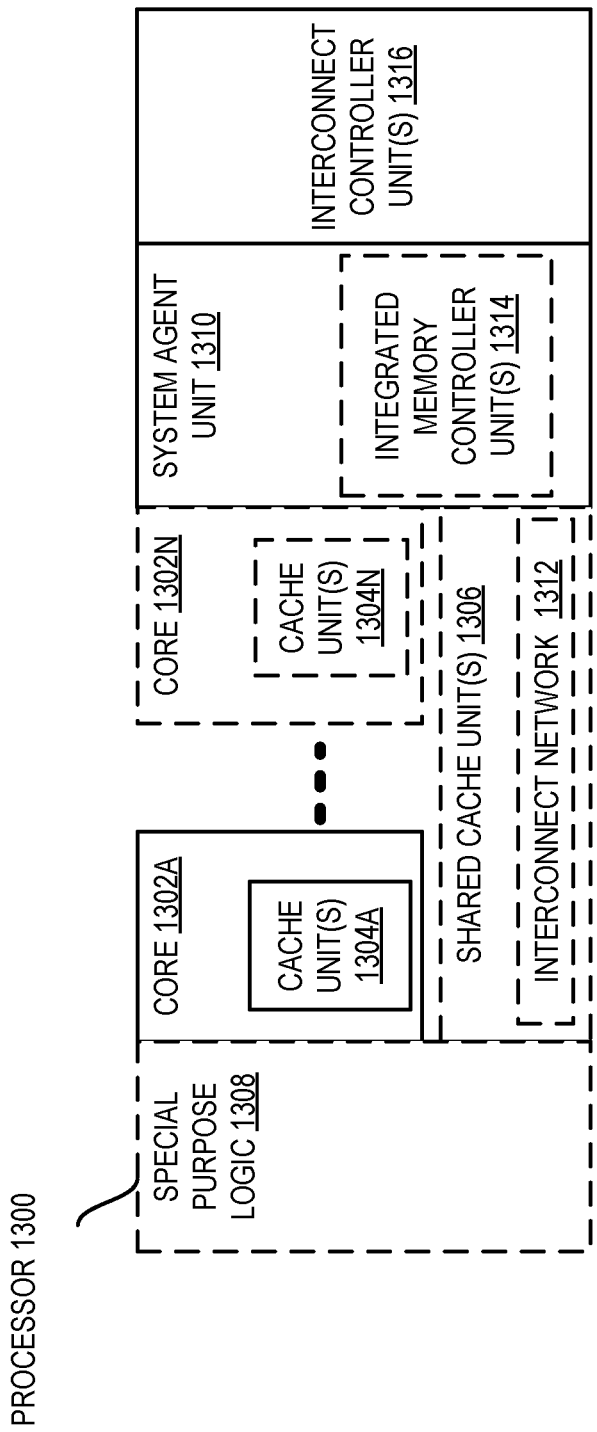
FIG. 13 illustrates a block diagram of embodiments of a processor that may have more than one core, may have an integrated memory controller, and may have integrated graphics.

FIG. 13 illustrates a block diagram of embodiments of a processor 1300 that may have more than one core, may have an integrated memory controller, and may have integrated graphics. The solid lined boxes illustrate a processor 1300 with a single core 1302A, a system agent 1310, a set of one or more interconnect controller units circuitry 1316, while the optional addition of the dashed lined boxes illustrates an alternative processor 1300 with multiple cores 1302(A)-(N), a set of one or more integrated memory controller unit(s) circuitry 1314 in the system agent unit circuitry 1310, and special purpose logic 1308, as well as a set of one or more interconnect controller units circuitry 1316. Note that the processor 1300 may be one of the processors 1270 or 1280, or co-processor 1238 or 1215 of FIG. 12.

Thus, different implementations of the processor 1300 may include: 1) a CPU with the special purpose logic 1308 being integrated graphics and/or scientific (throughput) logic (which may include one or more cores, not shown), and the cores 1302(A)-(N) being one or more general purpose cores (e.g., general purpose in-order cores, general purpose out-of-order cores, or a combination of the two); 2)

a coprocessor with the cores 1302(A)-(N) being a large number of special purpose cores intended primarily for graphics and/or scientific (throughput); and 3) a coprocessor with the cores 1302(A)-(N) being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

A memory hierarchy includes one or more levels of cache unit(s) circuitry 1304(A)-(N) within the cores 1302(A)-(N), a set of one or more shared cache units circuitry 1306, and external memory (not shown) coupled to the set of integrated memory controller units circuitry 1314. The set of one or more shared cache units circuitry 1306 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1312 interconnects the special purpose logic 1308 (e.g., integrated graphics logic), the set of shared cache units circuitry 1306, and the system agent unit circuitry 1310, alternative embodiments use any number of well-known techniques for interconnecting such units. In some embodiments, coherency is maintained between one or more of the shared cache units circuitry 1306 and cores 1302(A)-(N).

In some embodiments, one or more of the cores 1302(A)-(N) are capable of multi-threading. The system agent unit circuitry 1310 includes those components coordinating and operating cores 1302(A)-(N). The system agent unit circuitry 1310 may include, for example, power control unit (PCU) circuitry and/or display unit circuitry (not shown). The PCU may be or may include logic and components needed for regulating the power state of the cores 1302(A)-(N) and/or the special purpose logic 1308 (e.g., integrated graphics logic). The display unit circuitry is for driving one or more externally connected displays.

The cores 1302(A)-(N) may be homogenous or heterogeneous in terms of architecture instruction set; that is, two or more of the cores 1302(A)-(N) may be capable of executing the same instruction set, while other cores may be capable of executing only a subset of that instruction set or a different instruction set.

Exemplary Core Architectures
In-Order and Out-of-Order Core Block Diagram

Figure 14A:
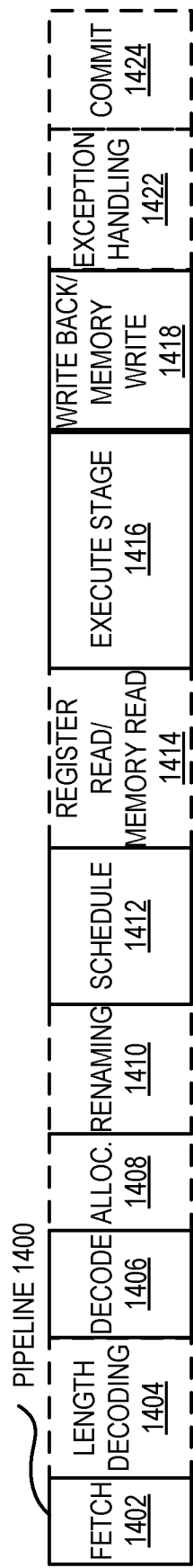
FIG. 14(A) is a block diagram illustrating both an exemplary in-order pipeline and an exemplary register renaming, out-of-order issue/execution pipeline according to embodiments of the invention.
Figure 14B:
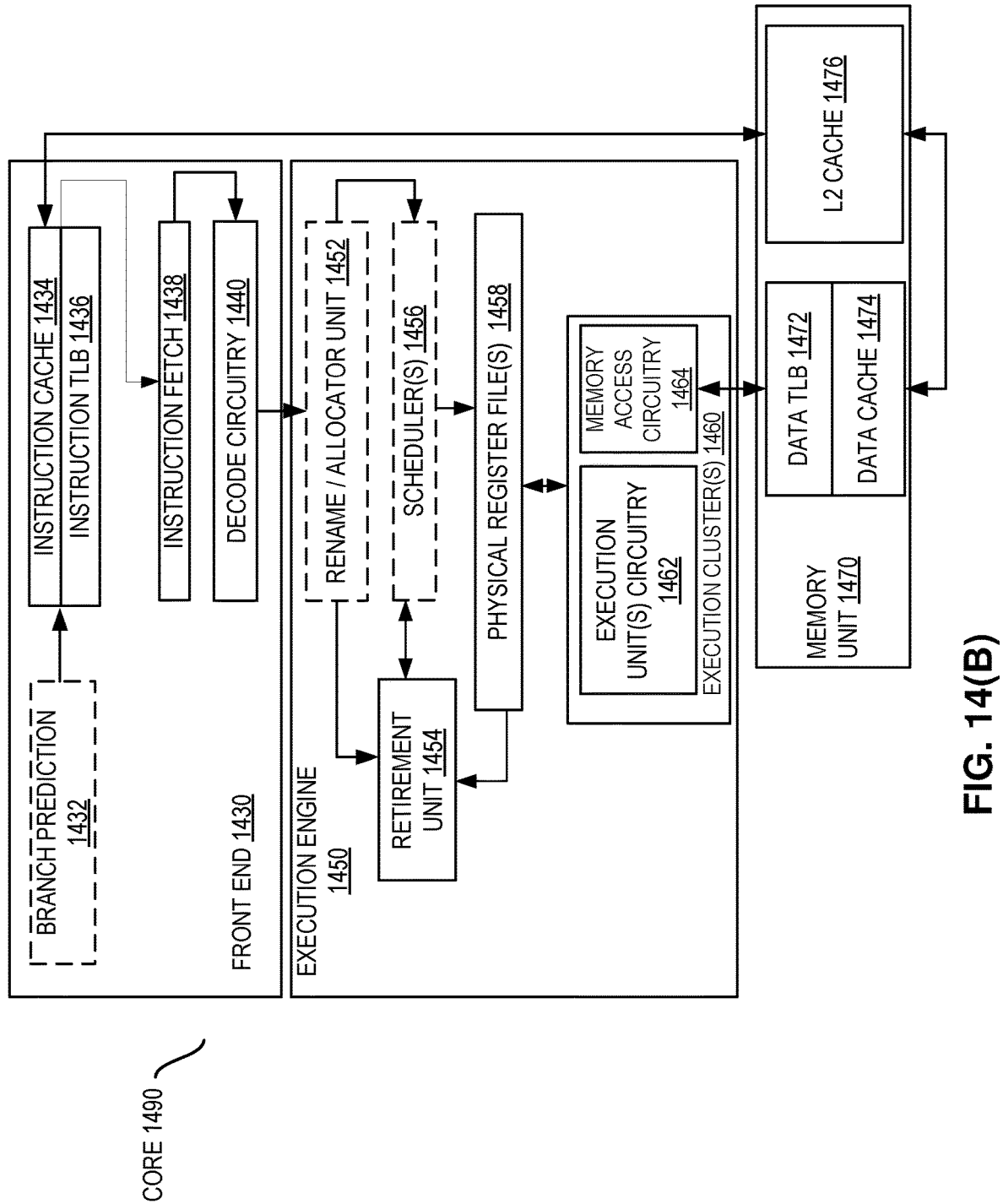
FIG. 14(B) is a block diagram illustrating both an exemplary embodiment of an in-order architecture core and an exemplary register renaming, out-of-order issue/execution architecture core to be included in a processor according to embodiments of the invention.

FIG. 14(A) is a block diagram illustrating both an exemplary in-order pipeline and an exemplary register renaming, out-of-order issue/execution pipeline according to embodiments of the invention. FIG. 14(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 14(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14(A), a processor pipeline 1400 includes a fetch stage 1402, an optional length decode stage 1404, a decode stage 1406, an optional allocation stage 1408, an optional renaming stage 1410, a scheduling (also known as a dispatch or issue) stage 1412, an optional register read/memory read stage 1414, an execute stage 1416, a write back/memory write stage 1418, an optional exception handling stage 1422, and an optional commit stage 1424. One or more operations can be performed in each of these processor pipeline stages. For example, during the fetch stage 1402, one or more instructions are fetched from instruction memory, during the decode stage 1406, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 1406 and the register read/memory read stage 1414 may be combined into one pipeline stage. In one embodiment, during the execute stage 1416, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit circuitry 1440 performs the decode stage 1406; 3) the rename/allocator unit circuitry 1452 performs the allocation stage 1408 and renaming stage 1410; 4) the scheduler unit(s) circuitry 1456 performs the schedule stage 1412; 5) the physical register file(s) unit(s) circuitry 1458 and the memory unit circuitry 1470 perform the register read/memory read stage 1414; the execution cluster 1460 perform the execute stage 1416; 6) the memory unit circuitry 1470 and the physical register file(s) unit(s) circuitry 1458 perform the write back/memory write stage 1418; 7) various units (unit circuitry) may be involved in the exception handling stage 1422; and 8) the retirement unit circuitry 1454 and the physical register file(s) unit(s) circuitry 1458 perform the commit stage 1424.

FIG. 14(B) shows processor core 1490 including front-end unit circuitry 1430 coupled to an execution engine unit circuitry 1450, and both are coupled to a memory unit circuitry 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit circuitry 1430 may include branch prediction unit circuitry 1432 coupled to an instruction cache unit circuitry 1434, which is coupled to an instruction translation lookaside buffer (TLB) 1436, which is coupled to instruction fetch unit circuitry 1438, which is coupled to decode unit circuitry 1440. In one embodiment, the instruction cache unit circuitry 1434 is included in the memory unit circuitry 1470 rather than the front-end unit circuitry 1430. The decode unit circuitry 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1440 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM (not shown) or other medium that stores microcode for certain macroinstructions (e.g., in decode unit circuitry 1440 or otherwise within the front end unit circuitry 1430). In one embodiment, the decode unit circuitry 1440 includes a micro-operation (micro-op) or operation cache (not shown) to hold/cache decoded operations, micro-tags, or micro-operations generated during the decode or other stages of the processor pipeline 1400. The decode unit circuitry 1440 may be coupled to rename/allocator unit circuitry 1452 in the execution engine unit circuitry 1450.

The execution engine circuitry 1450 includes the rename/allocator unit circuitry 1452 coupled to a retirement unit circuitry 1454 and a set of one or more scheduler(s) circuitry 1456. The scheduler(s) circuitry 1456 represents any number of different schedulers, including reservations stations, central instruction window, etc. In some embodiments, the scheduler(s) circuitry 1456 can include arithmetic logic unit (ALU) scheduler/scheduling circuitry, ALU queues, arithmetic generation unit (AGU) scheduler/scheduling circuitry, AGU queues, etc. The scheduler(s) circuitry 1456 is coupled to the physical register file(s) circuitry 1458. Each of the physical register file(s) circuitry 1458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1458 includes vector registers unit circuitry, writemask registers unit circuitry, and scalar register unit circuitry. These register units may provide architectural vector registers, vector mask registers, general-purpose registers, etc. The physical register file(s) unit(s) circuitry 1458 is overlapped by the retirement unit circuitry 1454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1454 and the physical register file(s) circuitry 1458 are coupled to the execution cluster(s) 1460. The execution cluster(s) 1460 includes a set of one or more execution units circuitry 1462 and a set of one or more memory access circuitry 1464. The execution units circuitry 1462 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1456, physical register file(s) unit(s) circuitry 1458, and execution cluster(s) 1460 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster- and in the case of a separate memory access pipeline, certain embodiments are implemented in which only the execution cluster of this pipeline has the memory access unit(s) circuitry 1464). It should also be understood that where separate pipelines are used, one or more of these pipelines may be out-of-order issue/execution and the rest in-order.

In some embodiments, the execution engine unit circuitry 1450 may perform load store unit (LSU) address/data pipelining to an Advanced Microcontroller Bus (AHB) interface (not shown), and address phase and writeback, data phase load, store, and branches.

The set of memory access circuitry 1464 is coupled to the memory unit circuitry 1470, which includes data TLB unit circuitry 1472 coupled to a data cache circuitry 1474 coupled to a level 2 (L2) cache circuitry 1476. In one exemplary embodiment, the memory access units circuitry 1464 may include a load unit circuitry, a store address unit circuit, and a store data unit circuitry, each of which is coupled to the data TLB circuitry 1472 in the memory unit circuitry 1470. The instruction cache circuitry 1434 is further coupled to a level 2 (L2) cache unit circuitry 1476 in the memory unit circuitry 1470. In one embodiment, the instruction cache 1434 and the data cache 1474 are combined into a single instruction and data cache (not shown) in L2 cache unit circuitry 1476, a level 3 (L3) cache unit circuitry (not shown), and/or main memory. The L2 cache unit circuitry 1476 is coupled to one or more other levels of cache and eventually to a main memory.

The core 1490 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1490 includes logic to support a packed data instruction set extension (e.g., AVX1, AVX2), thereby allowing the operations used by many multimedia applications to be performed using packed data.

Exemplary Execution Unit(s) Circuitry

Figure 15:
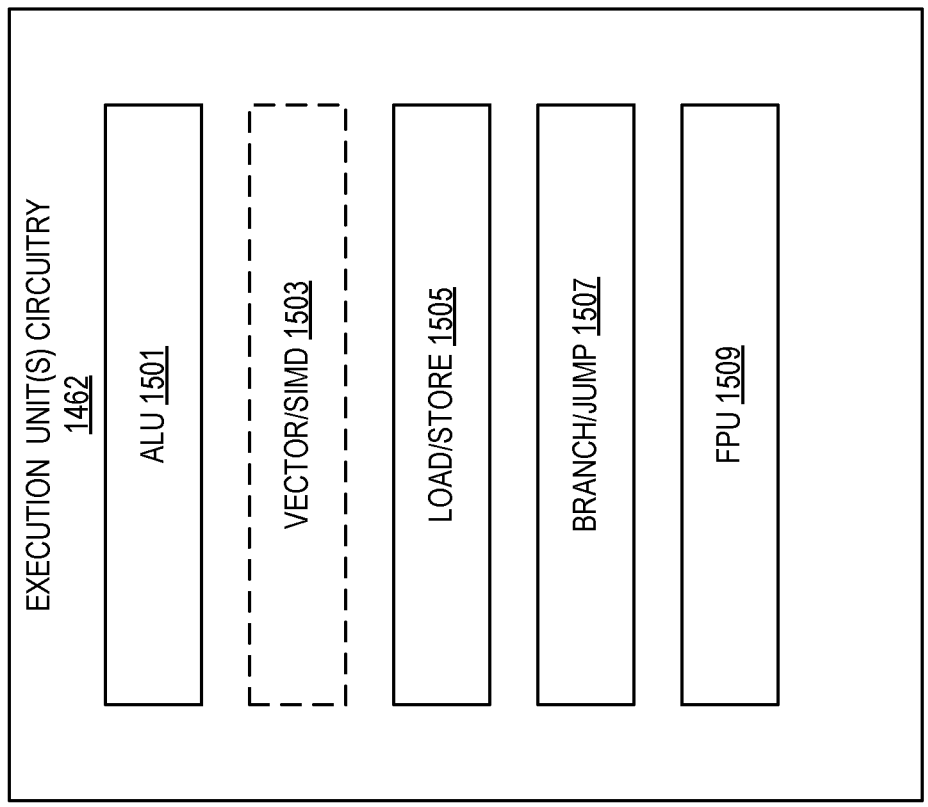
FIG. 15 illustrates embodiments of execution unit(s) circuitry, such as execution unit(s) circuitry of FIG. 14(B).

FIG. 15 illustrates embodiments of execution unit(s) circuitry, such as execution unit(s) circuitry 1462 of FIG. 14(B). As illustrated, execution unit(s) circuitry 1462 may include one or more ALU circuits 1501, vector/SIMD unit circuits 1503, load/store unit circuits 1505, and/or branch/jump unit circuits 1507. ALU circuits 1501 perform integer arithmetic and/or Boolean operations. Vector/SIMD unit circuits 1503 perform vector/SIMD operations on packed data (such as SIMD/vector registers). Load/store unit circuits 1505 execute load and store instructions to load data from memory into registers or store from registers to memory. Load/store unit circuits 1505 may also generate addresses. Branch/jump unit circuits 1507 cause a branch or jump to a memory address depending on the instruction. Floating-point unit (FPU) circuits 1509 perform floating-point arithmetic. The width of the execution unit(s) circuitry 1462 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 16:
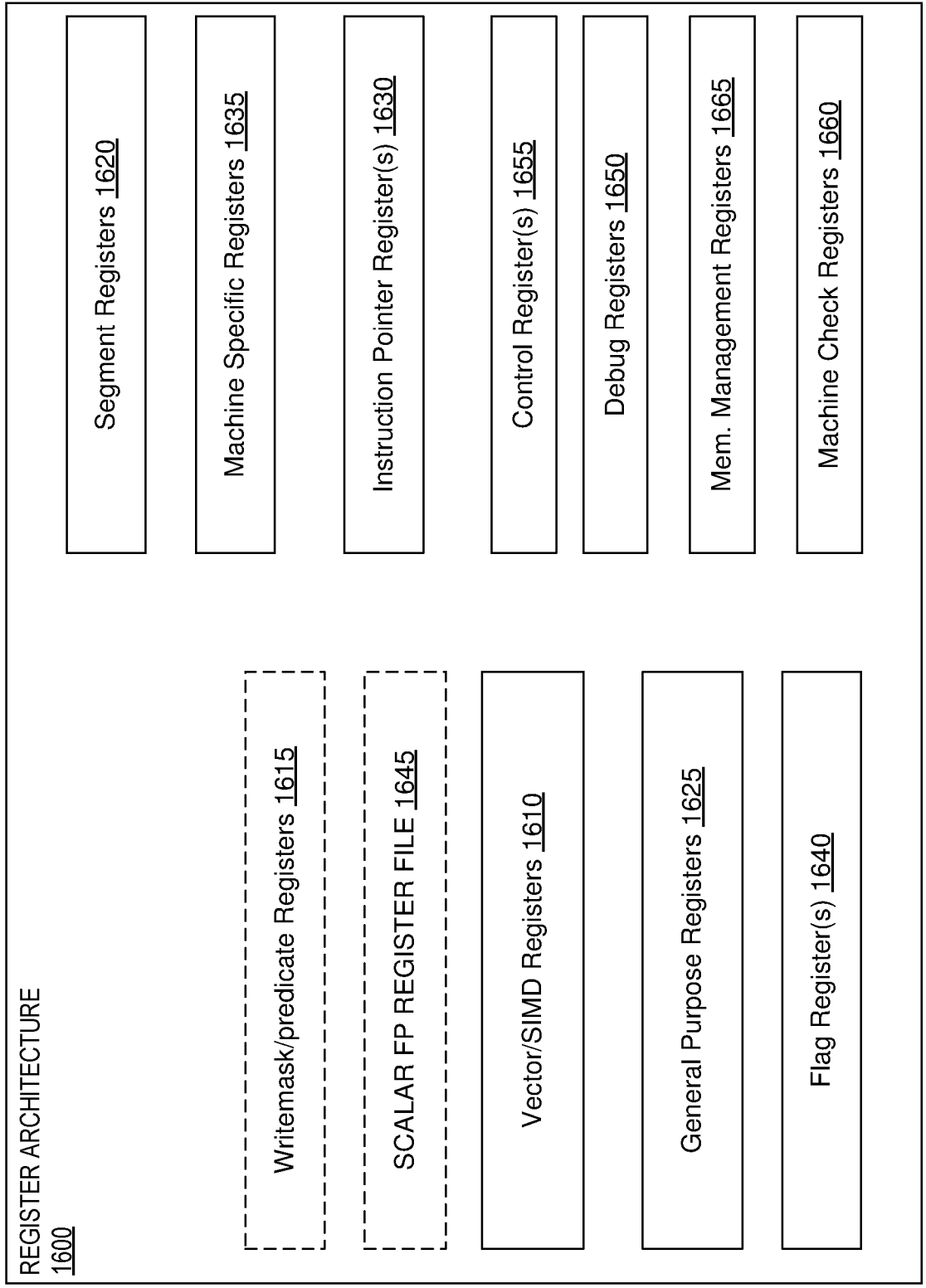
FIG. 16 is a block diagram of a register architecture according to some embodiments.

FIG. 16 is a block diagram of a register architecture 1600 according to some embodiments. As illustrated, there are vector/SIMD registers 1610 that vary from 128-bit to 1,024 bits width. In some embodiments, the vector/SIMD registers 1610 are physically 512-bits and, depending upon the mapping, only some of the lower bits are used. For example, in some embodiments, the vector/SIMD registers 1610 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1600 includes writemask/predicate registers 1615. For example, in some embodiments, there are 8 writemask/predicate registers (sometimes called k0 through k7) that are each 16-bit, 32-bit, 64-bit, or 128-bit in size. Writemask/predicate registers 1615 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1615 corresponds to a data element position of the destination. In other embodiments, the writemask/predicate registers 1615 are scalable and consists of a set number of enable bits for a given vector element (e.g., 8 enable bits per 64-bit vector element).

The register architecture 1600 includes a plurality of general-purpose registers 1625. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1600 includes scalar floating-point register 1645 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1640 (e.g., EFLAGS, RFLAGS, etc.) store status and control information for arithmetic, compare, and system operations. For example, the one or more flag registers 1640 may store condition code information such as carry, parity, auxiliary carry, zero, sign, and overflow. In some embodiments, the one or more flag registers 1640 are called program status and control registers.

Segment registers 1620 contain segment points for use in accessing memory. In some embodiments, these registers are referenced by the names CS, DS, SS, ES, FS, and GS.

Machine specific registers (MSRs) 1635 control and report on processor performance. Most MSRs 1635 handle system-related functions and are not accessible to an application program. Machine check registers 1660 consist of control, status, and error reporting MSRs that are used to detect and report on hardware errors.

One or more instruction pointer register(s) 1630 store an instruction pointer value. Control register(s) 1655 (e.g., CR0-CR4) determine the operating mode of a processor (e.g., processor 1270, 1280, 1238, 1215, and/or 1300) and the characteristics of a currently executing task. Debug registers 1650 control and allow for the monitoring of a processor or core's debugging operations.

Memory management registers 1665 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 17:
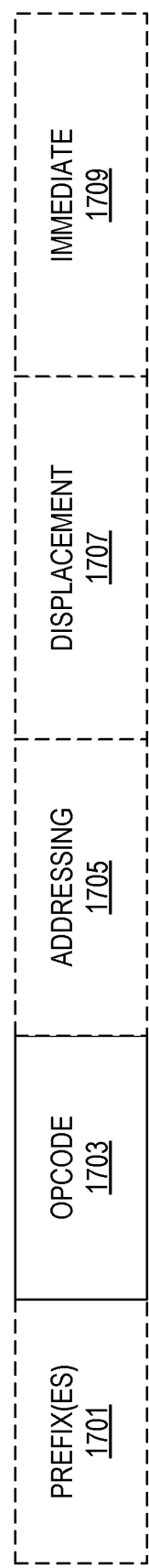
FIG. 17 illustrates embodiments of an instruction format.

FIG. 17 illustrates embodiments of an instruction format. As illustrated, an instruction may include multiple components including, but not limited to, one or more fields for: one or more prefixes 1701, an opcode 1703, addressing information 1705 (e.g., register identifiers, memory addressing information, etc.), a displacement value 1707, and/or an immediate 1709. Note that some instructions utilize some or all of the fields of the format whereas others may only use the field for the opcode 1703. In some embodiments, the order illustrated is the order in which these fields are to be encoded, however, it should be appreciated that in other embodiments these fields may be encoded in a different order, combined, etc.

The prefix(es) field(s) 1701, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1703 is used to at least partially define the operation to be performed upon a decoding of the instruction. In some embodiments, a primary opcode encoded in the opcode field 1703 is 1, 2, or 3 bytes in length. In other embodiments, a primary opcode can be a different length. An additional 3-bit opcode field is sometimes encoded in another field.

Figure 18:
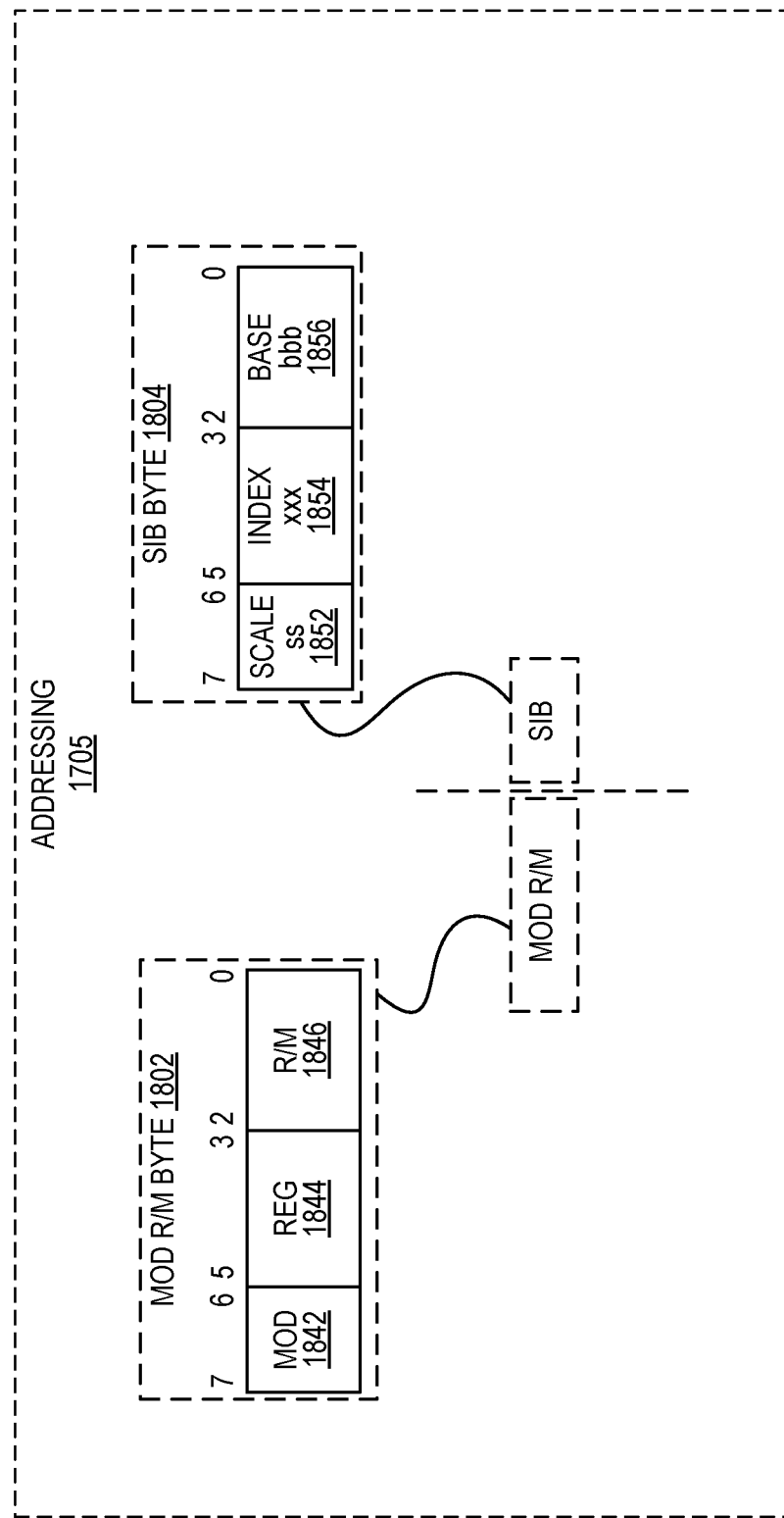
FIG. 18 illustrates embodiments of an addressing field.

The addressing field 1705 is used to address one or more operands of the instruction, such as a location in memory or one or more registers. FIG. 18 illustrates embodiments of the addressing field 1705. In this illustration, an optional ModR/M byte 1802 and an optional Scale, Index, Base (SIB) byte 1804 are shown. The ModR/M byte 1802 and the SIB byte 1804 are used to encode up to two operands of an instruction, each of which is a direct register or effective memory address. Note that each of these fields are optional in that not all instructions include one or more of these fields. The MOD R/M byte 1802 includes a MOD field 1842, a register field 1844, and R/M field 1846.

The content of the MOD field 1842 distinguishes between memory access and non-memory access modes. In some embodiments, when the MOD field 1842 has a value of b11, a register-direct addressing mode is utilized, and otherwise register-indirect addressing is used.

The register field 1844 may encode either the destination register operand or a source register operand, or may encode an opcode extension and not be used to encode any instruction operand. The content of register index field 1844, directly or through address generation, specifies the locations of a source or destination operand (either in a register or in memory). In some embodiments, the register field 1844 is supplemented with an additional bit from a prefix (e.g., prefix 1701) to allow for greater addressing.

The R/M field 1846 may be used to encode an instruction operand that references a memory address, or may be used to encode either the destination register operand or a source register operand. Note the R/M field 1846 may be combined with the MOD field 1842 to dictate an addressing mode in some embodiments.

The SIB byte 1804 includes a scale field 1852, an index field 1854, and a base field 1856 to be used in the generation of an address. The scale field 1852 indicates scaling factor. The index field 1854 specifies an index register to use. In some embodiments, the index field 1854 is supplemented with an additional bit from a prefix (e.g., prefix 1701) to allow for greater addressing. The base field 1856 specifies a base register to use. In some embodiments, the base field 1856 is supplemented with an additional bit from a prefix (e.g., prefix 1701) to allow for greater addressing. In practice, the content of the scale field 1852 allows for the scaling of the content of the index field 1854 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1707 provides this value. Additionally, in some embodiments, a displacement factor usage is encoded in the MOD field of the addressing field 1705 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1707.

In some embodiments, an immediate field 1709 specifies an immediate for the instruction. An immediate may be encoded as a 1-byte value, a 2-byte value, a 4-byte value, etc.

Figure 19:
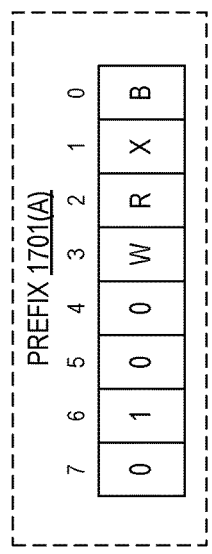
FIG. 19 illustrates embodiments of a first prefix.

FIG. 19 illustrates embodiments of a first prefix 1701(A). In some embodiments, the first prefix 1701(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1701(A) may specify up to three registers using 3-bit fields depending on the format: 1) using the reg field 1844 and the R/M field 1846 of the Mod R/M byte 1802; 2) using the Mod R/M byte 1802 with the SIB byte 1804 including using the reg field 1844 and the base field 1856 and index field 1854; or 3) using the register field of an opcode.

In the first prefix 1701(A), bit positions 7:4 are set as 0100. Bit position 3(W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1844 and MOD R/M R/M field 1846 alone can each only address 8 registers.

In the first prefix 1701(A), bit position 2(R) may an extension of the MOD R/M reg field 1844 and may be used to modify the ModR/M reg field 1844 when that field encodes a general purpose register, a 64-bit packed data register (e.g., a SSE register), or a control or debug register. R is ignored when Mod R/M byte 1802 specifies other registers or defines an extended opcode.

Bit position 1(X) X bit may modify the SIB byte index field 1854.

Bit position B (B) B may modify the base in the Mod R/M R/M field 1846 or the SIB byte base field 1856; or it may modify the opcode register field used for accessing general purpose registers (e.g., general purpose registers 1625).

Figure 20A:
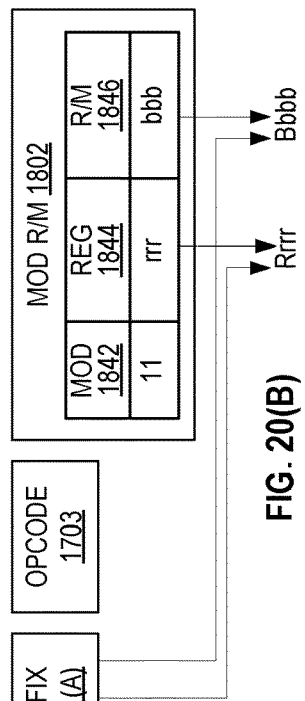
FIGS. 20(A)-(D) illustrate embodiments of how the R, X, and B fields of the first prefix 1701(A) are used.
Figure 20B:
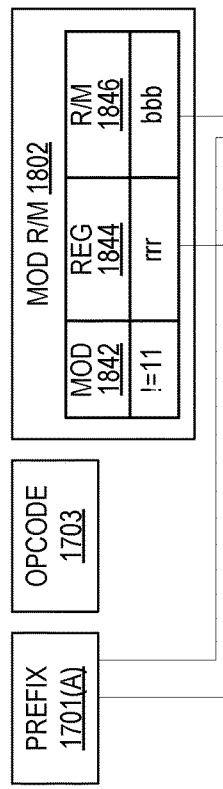
Figure 20C:
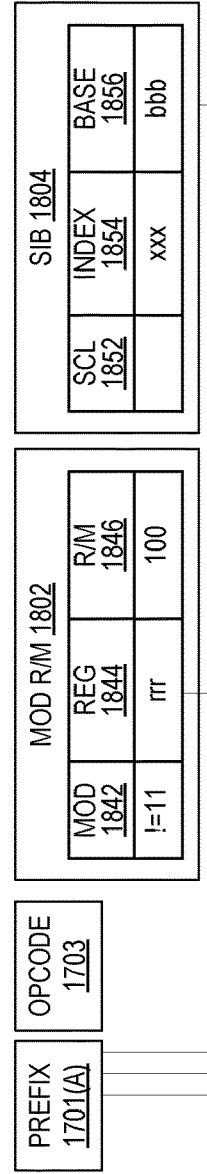
Figure 20D:
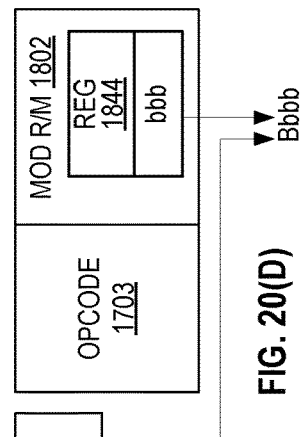

FIGS. 20(A)-(D) illustrate embodiments of how the R, X, and B fields of the first prefix 1701(A) are used. FIG. 20(A) illustrates R and B from the first prefix 1701(A) being used to extend the reg field 1844 and R/M field 1846 of the MOD R/M byte 1802 when the SIB byte 1804 is not used for memory addressing. FIG. 20(B) illustrates R and B from the first prefix 1701(A) being used to extend the reg field 1844 and R/M field 1846 of the MOD R/M byte 1802 when the SIB byte 1804 is not used (register-register addressing). FIG. 20(C) illustrates R, X, and B from the first prefix 1701(A) being used to extend the reg field 1844 of the MOD R/M byte 1802 and the index field 1854 and base field 1856 when the SIB byte 1804 being used for memory addressing. FIG. 20(D) illustrates B from the first prefix 1701(A) being used to extend the reg field 1844 of the MOD R/M byte 1802 when a register is encoded in the opcode 1703.

Figure 21A:
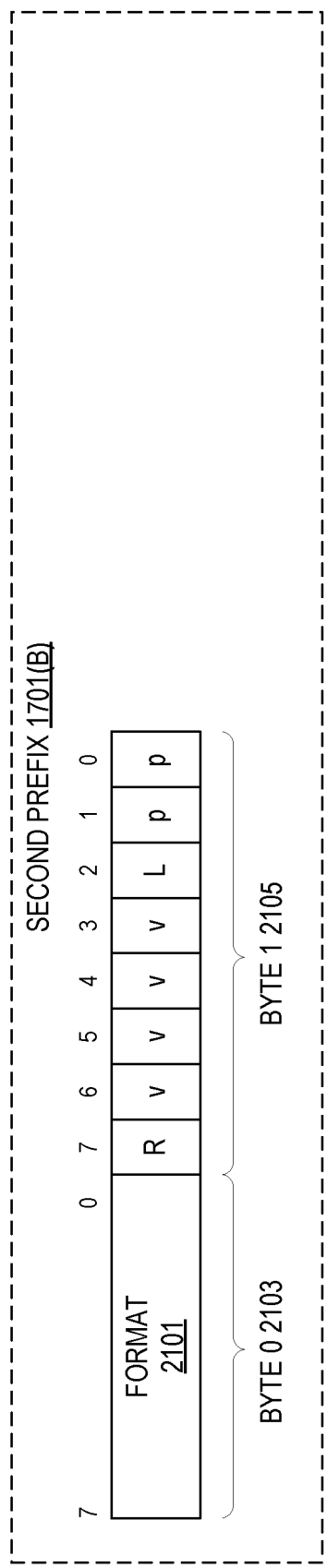
FIGS. 21(A)-(B) illustrate embodiments of a second prefix.
Figure 21B:
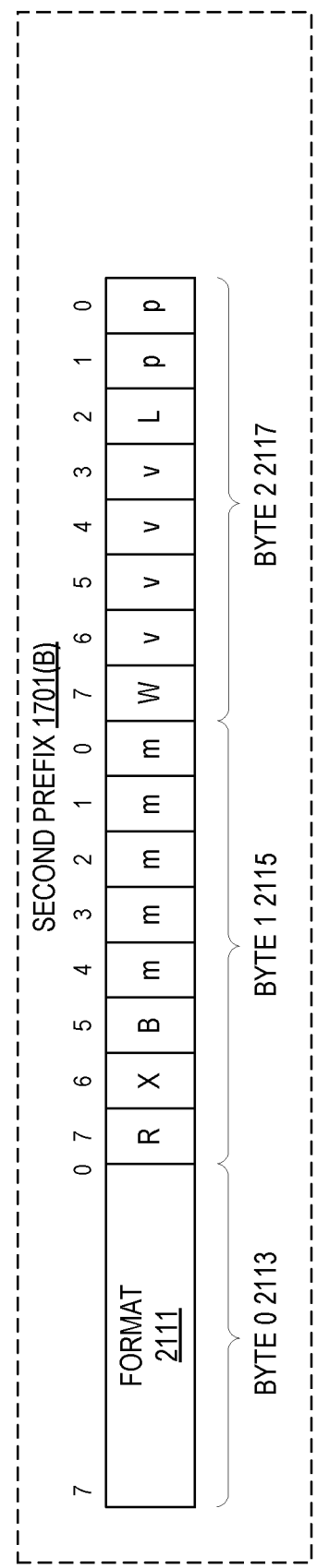

FIGS. 21(A)-(B) illustrate embodiments of a second prefix 1701(B). In some embodiments, the second prefix 1701(B) is an embodiment of a VEX prefix. The second prefix 1701(B) encoding allows instructions to have more than two operands, and allows SIMD vector registers (e.g., vector/SIMD registers 1610) to be longer than 64-bits (e.g., 128-bit and 256-bit). The use of the second prefix 1701(B) provides for three-operand (or more) syntax. For example, previous two-operand instructions performed operations such as A=A+B, which overwrites a source operand. The use of the second prefix 1701(B) enables operands to perform nondestructive operations such as A=B+C.

In some embodiments, the second prefix 1701(B) comes in two forms—a two-byte form and a three-byte form. The two-byte second prefix 1701(B) is used mainly for 128-bit, scalar, and some 256-bit instructions; while the three-byte second prefix 1701(B) provides a compact replacement of the first prefix 1701(A) and 3-byte opcode instructions.

FIG. 21(A) illustrates embodiments of a two-byte form of the second prefix 1701(B). In one example, a format field 2101 (byte 0 2103) contains the value C5H. In one example, byte 1 2105 includes a "R" value in bit[7]. This value is the complement of the same value of the first prefix 1701(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846 and the Mod R/M reg field 1844 encode three of the four operands. Bits[7:4] of the immediate 1709 are then used to encode the third source register operand.

FIG. 21(B) illustrates embodiments of a three-byte form of the second prefix 1701(B). in one example, a format field 2111 (byte 0 2113) contains the value C4H. Byte 1 2115 includes in bits[7:5] "R," "X," and "B" which are the complements of the same values of the first prefix 1701(A). Bits[4:0] of byte 1 2115 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2117 is used similar to W of the first prefix 1701(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1846 to encode the instruction operand that references a memory address or encode either the destination register operand or a source register operand.

Instructions that use this prefix may use the Mod R/M reg field 1844 to encode either the destination register operand or a source register operand, be treated as an opcode extension and not used to encode any instruction operand.

For instruction syntax that support four operands, vvvv, the Mod R/M R/M field 1846, and the Mod R/M reg field 1844 encode three of the four operands. Bits[7:4] of the immediate 1709 are then used to encode the third source register operand.

Figure 22:
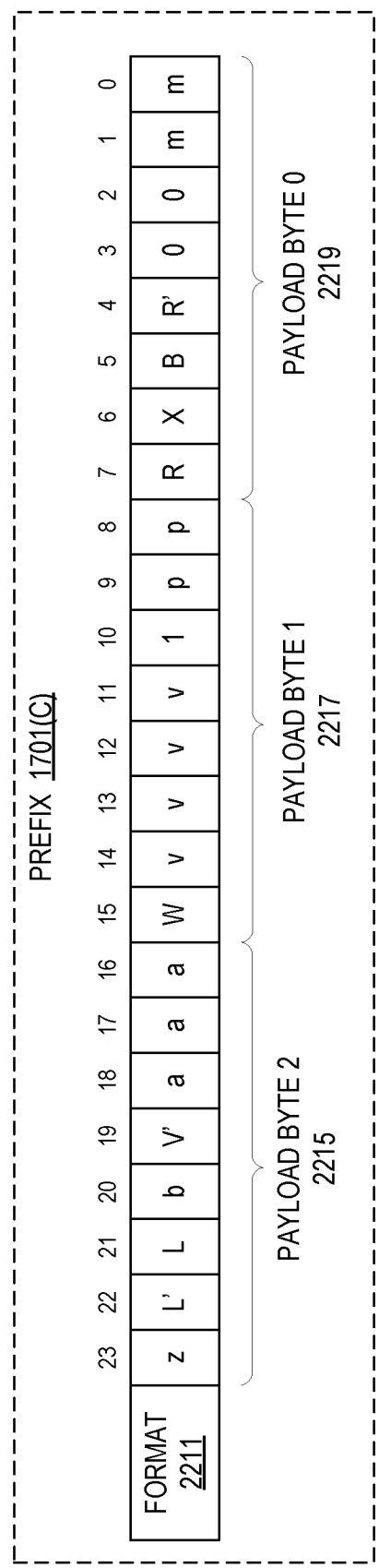
FIG. 22 illustrates embodiments of a third prefix.

FIG. 22 illustrates embodiments of a third prefix 1701(C). In some embodiments, the first prefix 1701(A) is an embodiment of an EVEX prefix. The third prefix 1701(C) is a four-byte prefix.

The third prefix 1701(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 16) or predication utilize this prefix. Opmask register allow for conditional processing or selection control. Opmask instructions, whose source/destination operands are opmask registers and treat the content of an opmask register as a single value, are encoded using the second prefix 1701(B).

The third prefix 1701(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1701(C) is a format field 2211 that has a value, in one example, of 62H. Subsequent bytes are referred to as payload bytes 2215-2219 and collectively form a 24-bit value of P[23:0] providing specific capability in the form of one or more fields (detailed herein).

In some embodiments, P[1:0] of payload byte 2219 are identical to the low two mmmmm bits. P[3:2] are reserved in some embodiments. Bit P[4] (R') allows access to the high 16 vector register set when combined with P[7] and the ModR/M reg field 1844. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1844 and ModR/M R/M field 1846. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P8 15] is similar to W of the first prefix 1701(A) and second prefix 1711(B) and may serve as an opcode extension bit or operand size promotion.

P[18:16] specify the index of a register in the opmask (writemask) registers (e.g., writemask/predicate registers 1615). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1701(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
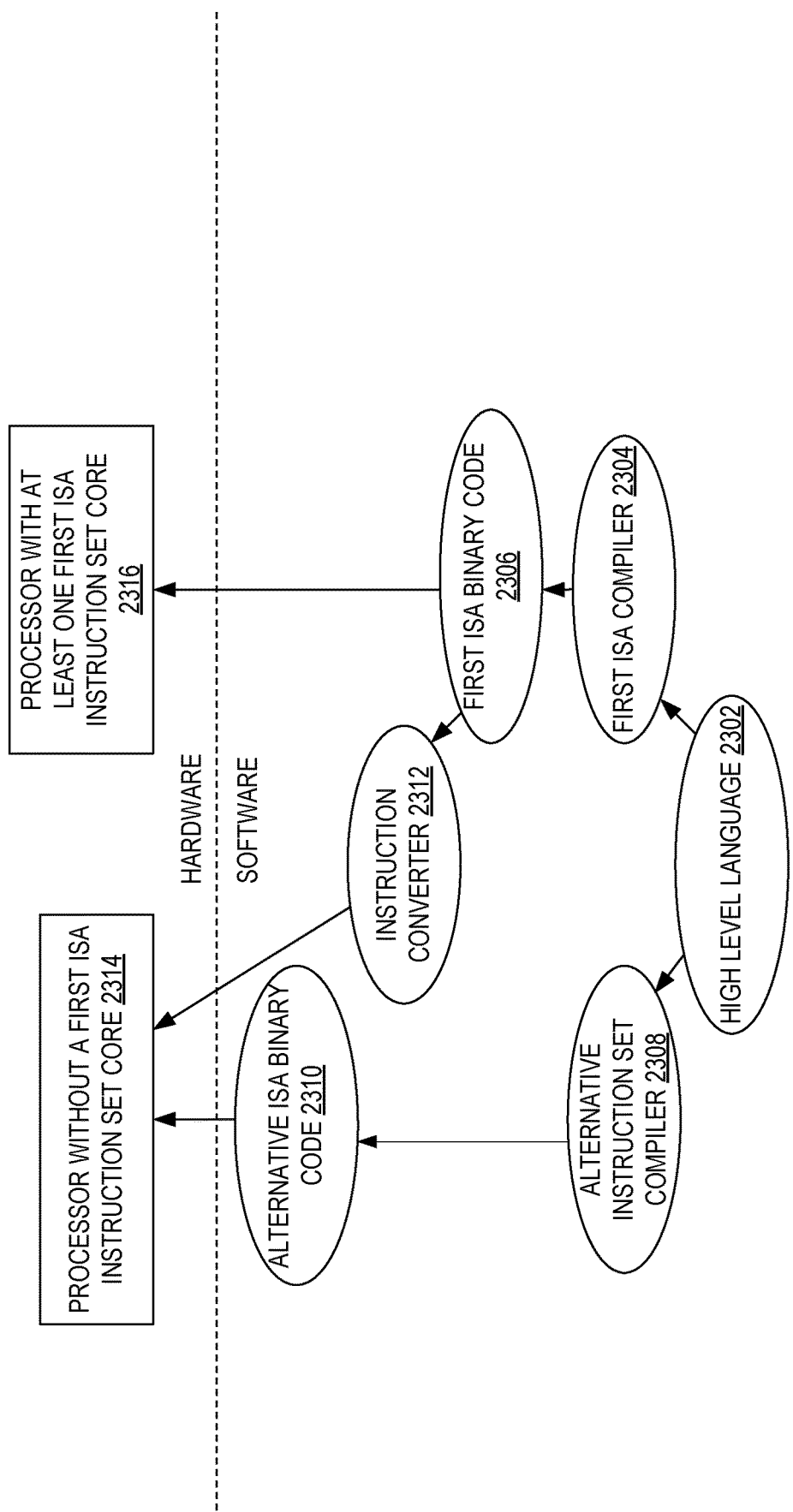
FIG. 23 illustrates a block diagram contrasting the use of a software instruction converter to convert binary instructions in a source instruction set to binary instructions in a target instruction set according to embodiments of the invention.

FIG. 23 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high-level language 2302 may be compiled using a first ISA compiler 2304 to generate first ISA binary code 2306 that may be natively executed by a processor with at least one first instruction set core 2316. The processor with at least one first ISA instruction set core 2316 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2304 represents a compiler that is operable to generate first ISA binary code 2306 (e.g., object code) that can, with or without additional linkage processing, be executed on the processor with at least one first ISA instruction set core 2316. Similarly, FIG. 23 shows the program in the high-level language 2302 may be compiled using an alternative instruction set compiler 2308 to generate alternative instruction set binary code 2310 that may be natively executed by a processor without a first ISA instruction set core 2314. The instruction converter 2312 is used to convert the first ISA binary code 2306 into code that may be natively executed by the processor without a first ISA instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have a first ISA instruction set processor or core to execute the first ISA binary code 2306.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary support for operations involving packed BF16 data elements include, but are not limited to:

1. An apparatus comprising:
    decode circuitry to decode an instance of a single instruction, the single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value, wherein a value of the exponent of the power of 2 value is a floor value of a data element of the second packed data source, and store a result of the floating point scale operation into a corresponding data element position of the packed data destination operand; and
    the execution circuitry to execute the decoded instruction according to the opcode.
2. The apparatus of claim 1, wherein the field for the identification of the first source operand is to identify a vector register.
3. The apparatus of claim 1, wherein the field for the identification of the first source operand is to identify a memory location.
4. The apparatus of claim 1, wherein the execution circuitry is to use a round to nearest even rounding mode during execution of the decoded instruction.
5. The apparatus of claim 1, wherein the floor value is a zero when the data element of the second packed data source is a denormal.
6. The apparatus of claim 1, wherein the data element of the first packed data source is a zero when the data element of the first packed data source is a denormal.
7. The apparatus of claim 1, wherein the instruction is to further include one or more fields for a writemask register.
8. A system comprising:
    memory to store an instance of a single instruction;
    decode circuitry to decode the instance of the single instruction, the single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value, wherein a value of the exponent of the power of 2 value is a floor value of a data element of the second packed data source, and store a result of the floating point scale operation into a corresponding data element position of the packed data destination operand; and the execution circuitry to execute the decoded instruction according to the opcode.

9. The system of claim 8, wherein the field for the identification of the first source operand is to identify a vector register.

10. The system of claim 8, wherein the field for the identification of the first source operand is to identify a memory location.

11. The system of claim 8, wherein the execution circuitry is to use a round to nearest even rounding mode during execution of the decoded instruction.

12. The system of claim 8, wherein the floor value is a zero when the data element of the second packed data source is a denormal.

13. The system of claim 8, wherein the instruction is to further include one or more fields for a writemask register.

14. The system of claim 8, wherein the data element of the first packed data source is a zero when the data element of the first packed data source is a denormal.

15. A non-transitory machine-readable medium storing at least an instance of a particular single instruction, wherein the instance of the particular single instruction is to be processed by a processor by performing a method comprising:

decoding the instance of the single instruction, the single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value, wherein a value of the exponent of the power of 2 value is a floor value of a data element of the second packed data source, and store a result of the floating point scale operation into a corresponding data element position of the packed data destination operand; and executing the decoded instruction according to the opcode.

16. The non-transitory machine-readable medium of claim 15, wherein the field for the identification of the first source operand is to identify a vector register.

17. The non-transitory machine-readable medium of claim 15, wherein the field for the identification of the first source operand is to identify a memory location.

18. The non-transitory machine-readable medium of claim 15, wherein the executing is to use a round to nearest even rounding mode during execution of the decoded instruction.

19. The non-transitory machine-readable medium of claim 15, wherein the floor value is a zero when the data element of the second packed data source is a denormal.

20. The non-transitory machine-readable medium of claim 15, wherein the instruction is to further include one or more fields for a writemask register.

21. The non-transitory machine-readable medium of claim 15, wherein the data element of the first packed data source is a zero when the data element of the first packed data source is a denormal.

22. A non-transitory machine-readable medium storing at least an instance of a particular single instruction, wherein the instance of the particular single instruction is to be processed by a processor by performing a method comprising:

translating the particular single instruction from a first instruction set architecture to one or more instructions of a second, different instruction set architecture, the particular single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value, wherein a value of the exponent of the power of 2 value is a floor value of a data element of the second packed data source, and store a result of the floating point scale operation into a corresponding data element position of the packed data destination operand;

decoding the one or more instructions of a second, different instruction set architecture;

executing the decoded one or more instructions of a second, different instruction set architecture.

23. The non-transitory machine-readable medium of claim 22, wherein the field for the identification of the first source operand is to identify a vector register.

24. The non-transitory machine-readable medium of claim 22, wherein the field for the identification of the first source operand is to identify a memory location.

25. The non-transitory machine-readable medium of claim 22, wherein the executing is to use a round to nearest even rounding mode during execution of the decoded instruction.

26. The non-transitory machine-readable medium of claim 22, wherein the floor value is a zero when the data element of the second packed data source is a denormal.

27. The non-transitory machine-readable medium of claim 22, wherein the data element of the first packed data source is a zero when the data element of the first packed data source is a denormal.

28. The non-transitory machine-readable medium of claim 22, wherein the instruction is to further include one or more fields for a writemask register.

29. A method comprising:

translating the particular single instruction from a first instruction set architecture to one or more instructions of a second, different instruction set architecture, the particular single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a data element of the first packed data source by multiplying the data element by a power of 2 value, wherein a value of the exponent of the power of 2 value is a floor value of a data element of the second packed data source, and store a result of the floating point scale operation into a corresponding data element position of the packed data destination operand;

decoding the one or more instructions of a second, different instruction set architecture;

executing the decoded one or more instructions of a second, different instruction set architecture.

30. The non-transitory machine-readable medium of claim 29, wherein the field for the identification of the first source operand is to identify a vector register.

31. The non-transitory machine-readable medium of claim 29, wherein the field for the identification of the first source operand is to identify a memory location.

32. The non-transitory machine-readable medium of claim 29, wherein the executing is to use a round to nearest even rounding mode during execution of the decoded instruction.

33. The non-transitory machine-readable medium of claim 29, wherein the floor value is a zero when the data element of the second packed data source is a denormal.

34. The non-transitory machine-readable medium of claim 29, wherein the instruction is to further include one or more fields for a writemask register.

35. The non-transitory machine-readable medium of claim 29, wherein the data element of the first packed data source is a zero when the data element of the first packed data source is a denormal.

36. A method comprising:
    decoding an instance of a single instruction, the single instruction to include fields for an opcode, an identification of a location of a packed data source operand, an immediate, and an identification of a packed data destination operand, wherein the opcode is to indicate that execution circuitry is to perform, for each data element position of the packed data source operand, an extraction of a reduced argument of a data element of the packed data source by a number of bits specified in the immediate, and store the extracted reduced argument into a corresponding data element position of the packed data destination operand; and
    executing the decoded instruction according to the opcode.

37. The method of claim 36, further comprising:
    translating the single instruction into one or more instructions of a second, different instruction set architecture, wherein the executing comprises executing the one or more instructions of a second, different instruction set architecture.

38. An apparatus to perform the method of one or more of claims 36-37.

39. A method comprising:
    decoding an instance of a single instruction, the single instruction to include fields for an opcode, an identification of a location of a packed data source operand, an indication of a rounding mode, and an identification of a packed data destination operand, wherein the opcode is to indicate that execution circuitry is to, for each packed data element position of the packed data source operand, round the packed data element of that position by the indicated rounding mode and store a result of the round in a corresponding packed data element position of the packed data destination operand; and
    executing the decoded instruction according to the opcode.

40. The method of claim 39, further comprising:
    translating the single instruction into one or more instructions of a second, different instruction set architecture, wherein the executing comprises executing the one or more instructions of a second, different instruction set architecture.

41. An apparatus to perform the method of one or more of claims 40-41.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
    decode circuitry to decode an instance of a single instruction, the single instruction to include fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of an exponent of the power of 2 value is a floor value of a BF16 data element of the second packed data source, and store a result of the floating point scale operation into a corresponding data element position of the packed data destination operand; and
    the execution circuitry to execute the decoded instruction according to the opcode.

2. The apparatus of claim 1, wherein the field for the identification of the first source operand is to identify a vector register.

3. The apparatus of claim 1, wherein the field for the identification of the first source operand is to identify a memory location.

4. The apparatus of claim 1, wherein the execution circuitry is to use a round to nearest even rounding mode during execution of the decoded instruction.

5. The apparatus of claim 1, wherein the floor value is a zero when the data element of the second packed data source is a denormal.

6. The apparatus of claim 1, wherein the data element of the first packed data source is a zero when the data element of the first packed data source is a denormal.

7. The apparatus of claim 1, wherein the instruction is to further include one or more fields for a writemask register.

8. A system comprising:
    memory to store an instance of a single instruction;
    decode circuitry to decode the instance of the single instruction, the single instruction to include fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of an exponent of the power of 2 value is a floor value of a BF16 data element of the second packed data source, and store a result of the floating point scale operation into a corresponding data element position of the packed data destination operand; and the execution circuitry to execute the decoded instruction according to the opcode.

9. The system of claim 8, wherein the field for the identification of the first source operand is to identify a vector register.

10. The system of claim 8, wherein the field for the identification of the first source operand is to identify a memory location.

11. The system of claim 8, wherein the execution circuitry is to use a round to nearest even rounding mode during execution of the decoded instruction.

12. The system of claim 8, wherein the floor value is a zero when the data element of the second packed data source is a denormal.

13. The system of claim 8, wherein the instruction is to further include one or more fields for a writemask register.

14. The system of claim 8, wherein the data element of the first packed data source is a zero when the data element of the first packed data source is a denormal.

15. A non-transitory machine-readable medium storing at least an instance of a particular single instruction, wherein the instance of the particular single instruction is to be processed by a processor by performing a method comprising:

decoding the instance of the single instruction, the single instruction having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of an exponent of the power of 2 value is a floor value of a BF16 data element of the second packed data source, and store a result of the floating point scale operation into a corresponding data element position of the packed data destination operand; and executing the decoded instruction according to the opcode.

16. The non-transitory machine-readable medium of claim 15, wherein the field for the identification of the first source operand is to identify a vector register.

17. The non-transitory machine-readable medium of claim 15, wherein the field for the identification of the first source operand is to identify a memory location.

18. The non-transitory machine-readable medium of claim 15, wherein the executing is to use a round to nearest even rounding mode during execution of the decoded instruction.

19. The non-transitory machine-readable medium of claim 15, wherein the floor value is a zero when the data element of the second packed data source is a denormal.

20. The non-transitory machine-readable medium of claim 15, wherein the instruction is to further include one or more fields for a writemask register.

21. The non-transitory machine-readable medium of claim 15, wherein the data element of the first packed data source is a zero when the data element of the first packed data source is a denormal.

22. A non-transitory machine-readable medium storing at least an instance of a particular single instruction, wherein the instance of the particular single instruction is to be processed by a processor by performing a method comprising:

translating the particular single instruction from a first instruction set architecture to one or more instructions of a second, different instruction set architecture, the particular single instruction having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of an exponent of the power of 2 value is a floor value of a BF16 data element of the second packed data source, and store a result of the floating point scale operation into a corresponding data element position of the packed data destination operand;

decoding the one or more instructions of a second, different instruction set architecture;

executing the decoded one or more instructions of a second, different instruction set architecture.

23. The non-transitory machine-readable medium of claim 22, wherein the field for the identification of the first source operand is to identify a vector register.

24. The non-transitory machine-readable medium of claim 22, wherein the field for the identification of the first source operand is to identify a memory location.

25. The non-transitory machine-readable medium of claim 22, wherein the executing is to use a round to nearest even rounding mode during execution of the decoded instruction.

26. The non-transitory machine-readable medium of claim 22, wherein the floor value is a zero when the data element of the second packed data source is a denormal.

27. The non-transitory machine-readable medium of claim 22, wherein the data element of the first packed data source is a zero when the data element of the first packed data source is a denormal.

28. The non-transitory machine-readable medium of claim 22, wherein the instruction is to further include one or more fields for a writemask register.

29. A method comprising:

translating a particular single instruction from a first instruction set architecture to one or more instructions of a second, different instruction set architecture, the particular single instruction to include fields for an having fields for an opcode, an identification of a location of a first packed data source operand, an identification of a location of a second packed data source operand, and an identification of a packed data destination operand, wherein the opcode is to indicate that execution circuitry is to perform, for each data element position of the packed data source operands, a floating point scale operation of a BF16 data element of the first packed data source by multiplying the data element by a power of 2 value, wherein a value of an exponent of the power of 2 value is a floor value of a BF16 data element of the second packed data source, and store a result of the floating point scale operation into a corresponding data element position of the packed data destination operand;

decoding the one or more instructions of a second, different instruction set architecture;

executing the decoded one or more instructions of a second, different instruction set architecture.

30. The method of claim 29, wherein the field for the identification of the first source operand is to identify a vector register.

31. The method of claim 29, wherein the field for the identification of the first source operand is to identify a memory location.

32. The method of claim 29, wherein the executing is to use a round to nearest even rounding mode during execution of the decoded instruction.

33. The method of claim 29, wherein the floor value is a zero when the data element of the second packed data source is a denormal.

34. The method of claim 29, wherein the instruction is to further include one or more fields for a writemask register.

35. The method of claim 29, wherein the data element of the first packed data source is a zero when the data element of the first packed data source is a denormal.

* * * * *